US008036454B2

(12) United States Patent
Sumitomo

(10) Patent No.: US 8,036,454 B2
(45) Date of Patent: Oct. 11, 2011

(54) INFORMATION PROCESSING SYSTEM
(75) Inventor: Hironori Sumitomo, Tokyo (JP)
(73) Assignee: Konica Minolta Holdings, Inc., Tokyo (JP)
( * ) Notice: Subject to any disclaimer, the term of this patent is extended or adjusted under 35 U.S.C. 154(b) by 768 days.
(21) Appl. No.: 12/167,626
(22) Filed: Jul. 3, 2008
(65) Prior Publication Data
US 2009/0010530 A1  Jan. 8, 2009
(30) Foreign Application Priority Data

Jul. 6, 2007 (JP) ................................ 2007-178515

(51) Int. Cl.
*G06K 9/00* (2006.01)
(52) U.S. Cl. ....................................................... 382/154
(58) Field of Classification Search .................. 382/151, 382/154, 209, 278; 345/419
See application file for complete search history.

(56) References Cited

U.S. PATENT DOCUMENTS 6,041,140 A * 3/2000 Binns et al. .................... 382/209
7,298,889 B2 * 11/2007 Massen ........................... 382/154
7,599,548 B2 * 10/2009 Nishiyama ..................... 382/154
7,773,799 B2 * 8/2010 Oldroyd ......................... 382/154
* cited by examiner

*Primary Examiner* — Daniel Mariam
(74) *Attorney, Agent, or Firm* — Brinks Hofer Gilson & Lione

(57) ABSTRACT

An information processing system for performing processes on first image and second image captured from different viewpoints, comprising: a first specifying part for specifying a first corresponding point on the second image, corresponding to a designation point designated on the first image, by searching on a line along a first basis direction corresponding to a predetermined direction and passing through a position corresponding to the designation point in the second image; a second specifying part for specifying a second corresponding point on the second image, corresponding to the designation point, by searching on a line passing through the first corresponding point in the second image and along a second basis direction almost perpendicular to the first basis direction; and a third specifying part for specifying a third corresponding point on the second image, corresponding to the designation point, by searching on a line passing through the second corresponding point in the second image and along the first basis direction.

12 Claims, 22 Drawing Sheets

F I G . 7
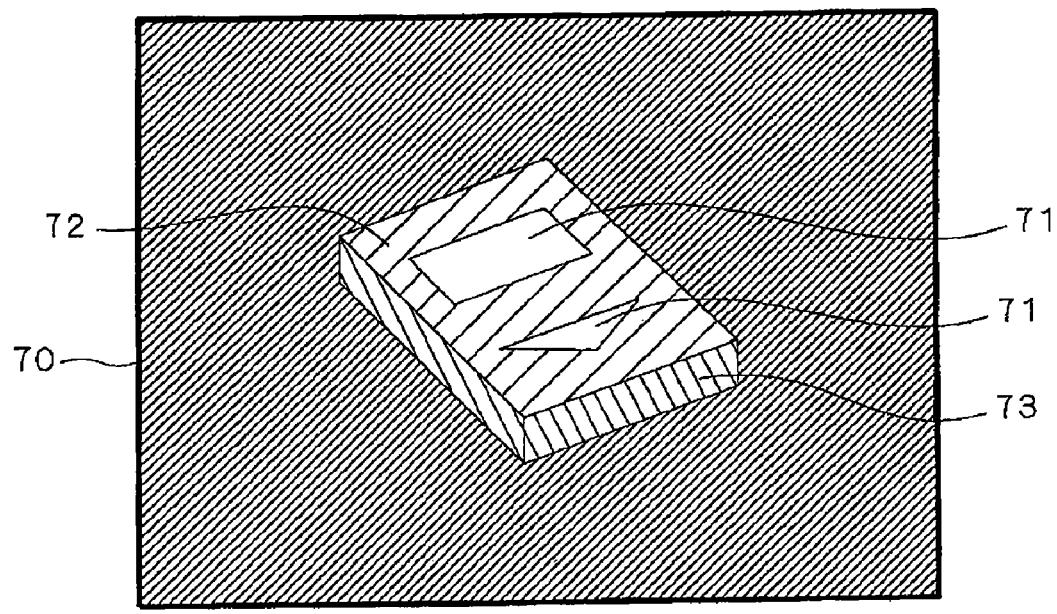

F I G . 1 0

| A1 | A2 | A3 | A4 | A5 | A6 | A7 | A8 | A9 |
|----|----|----|----|----|----|----|----|----|
| B1 | B2 | B3 | B4 | B5 | B6 | B7 | B8 | B9 |
| C1 | C2 | C3 | C4 | C5 | C6 | C7 | C8 | C9 |
| D1 | D2 | D3 | D4 | D5 | D6 | D7 | D8 | D9 |
| E1 | E2 | E3 | E4 | E5 | E6 | E7 | E8 | E9 |

3R3

3R3

3R

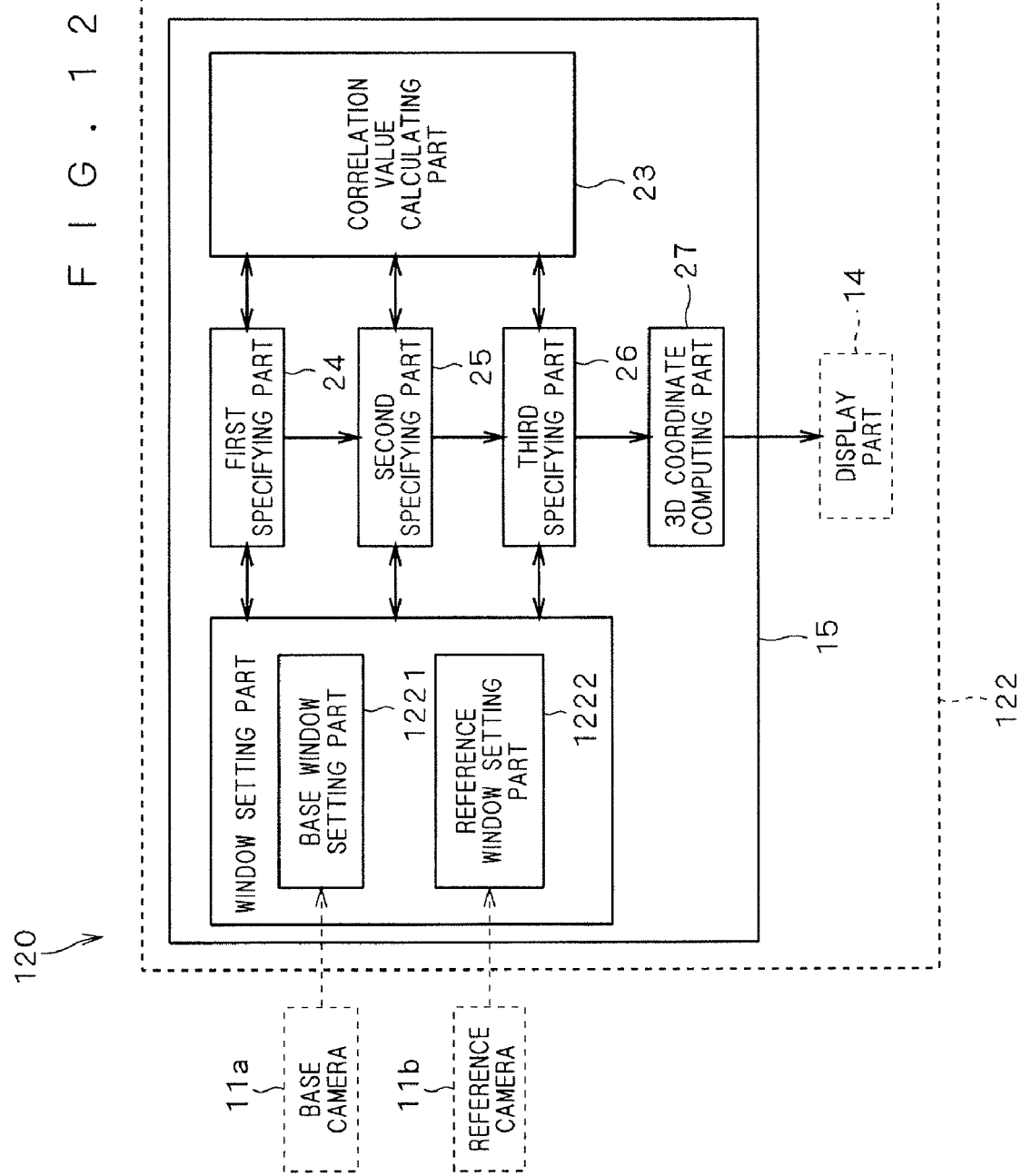

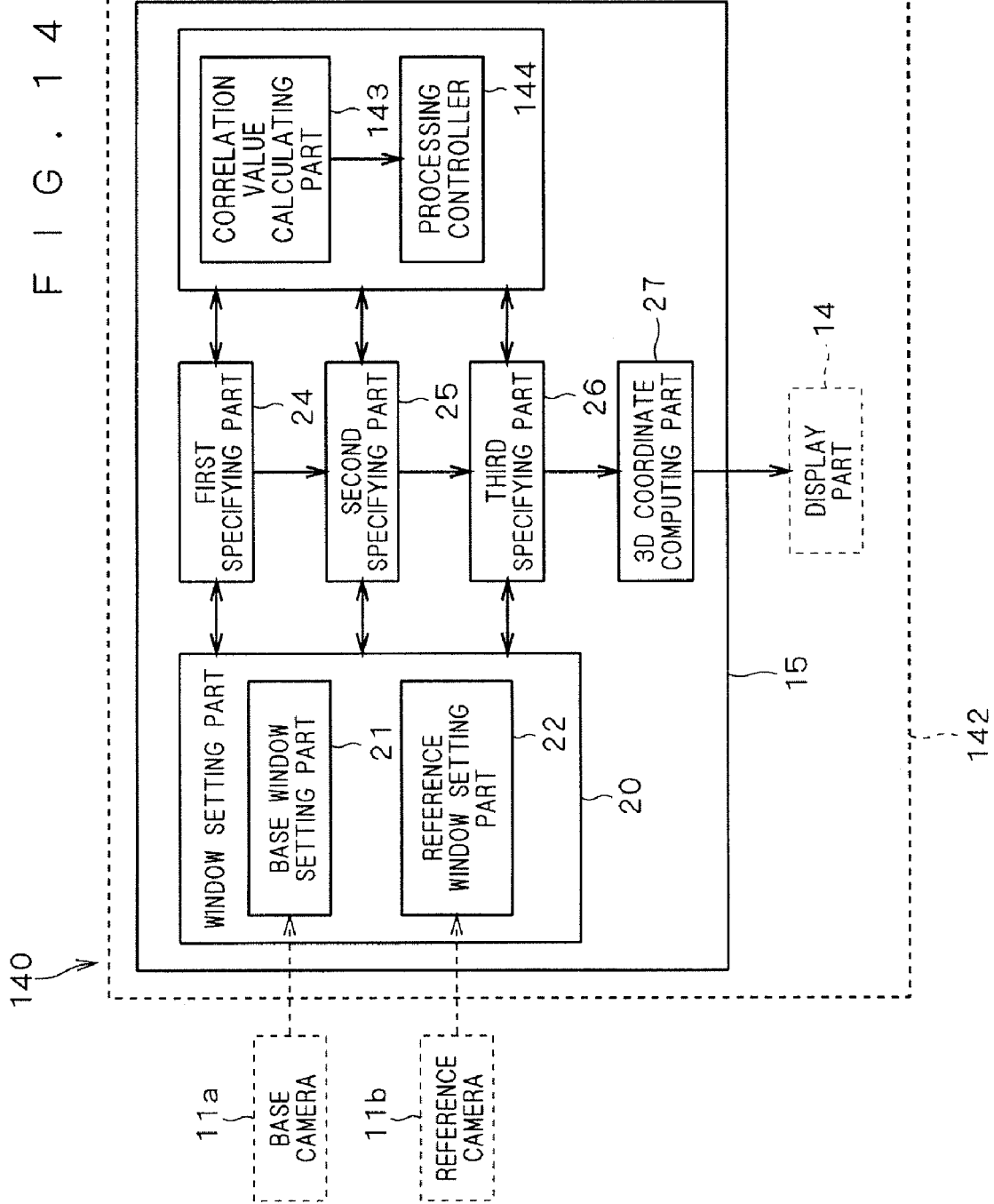

F I G . 1 6
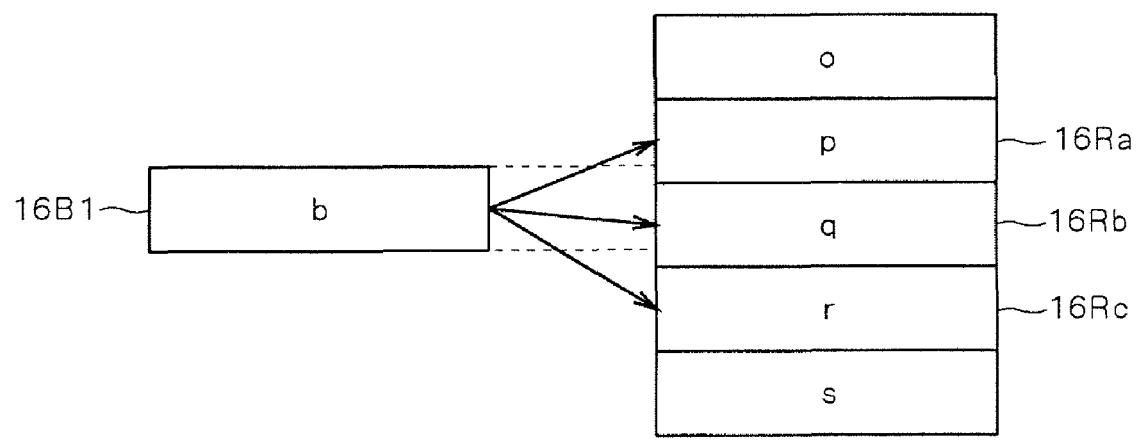

F I G . 1 8
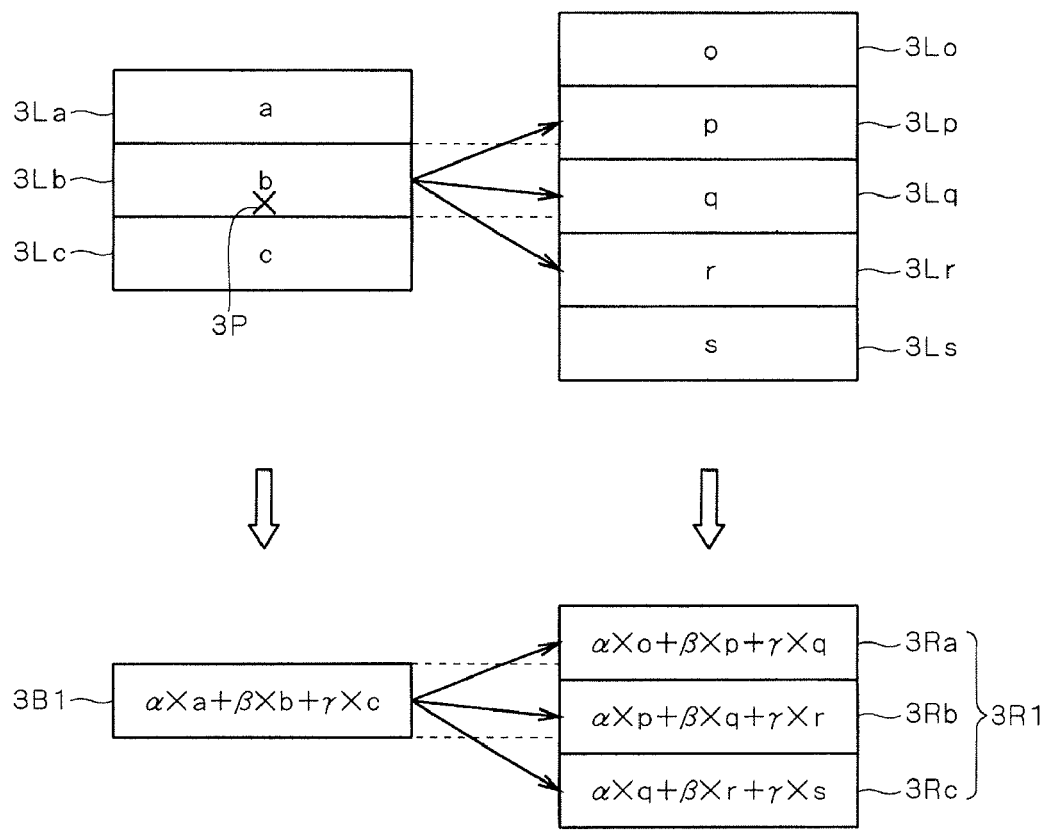

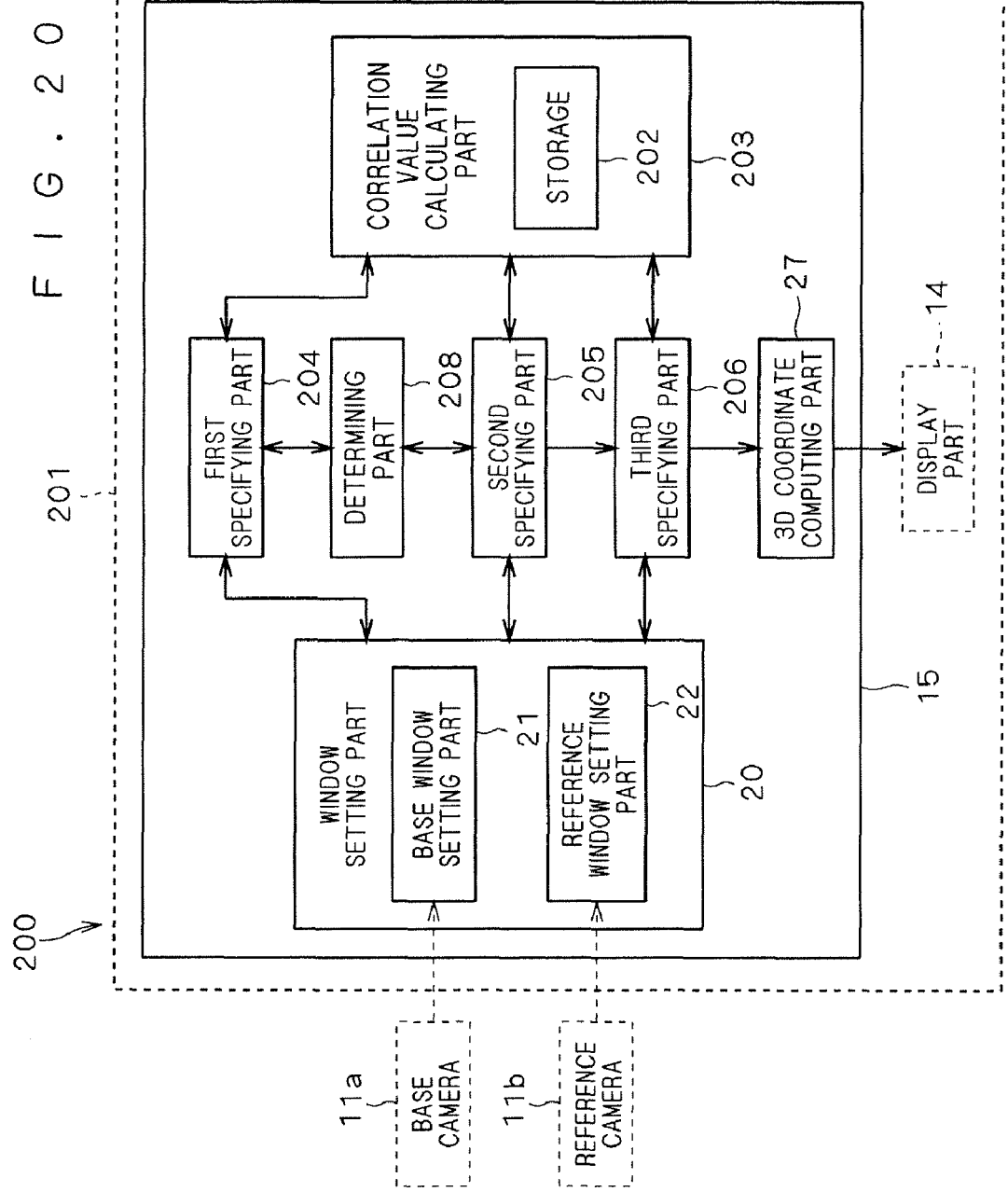

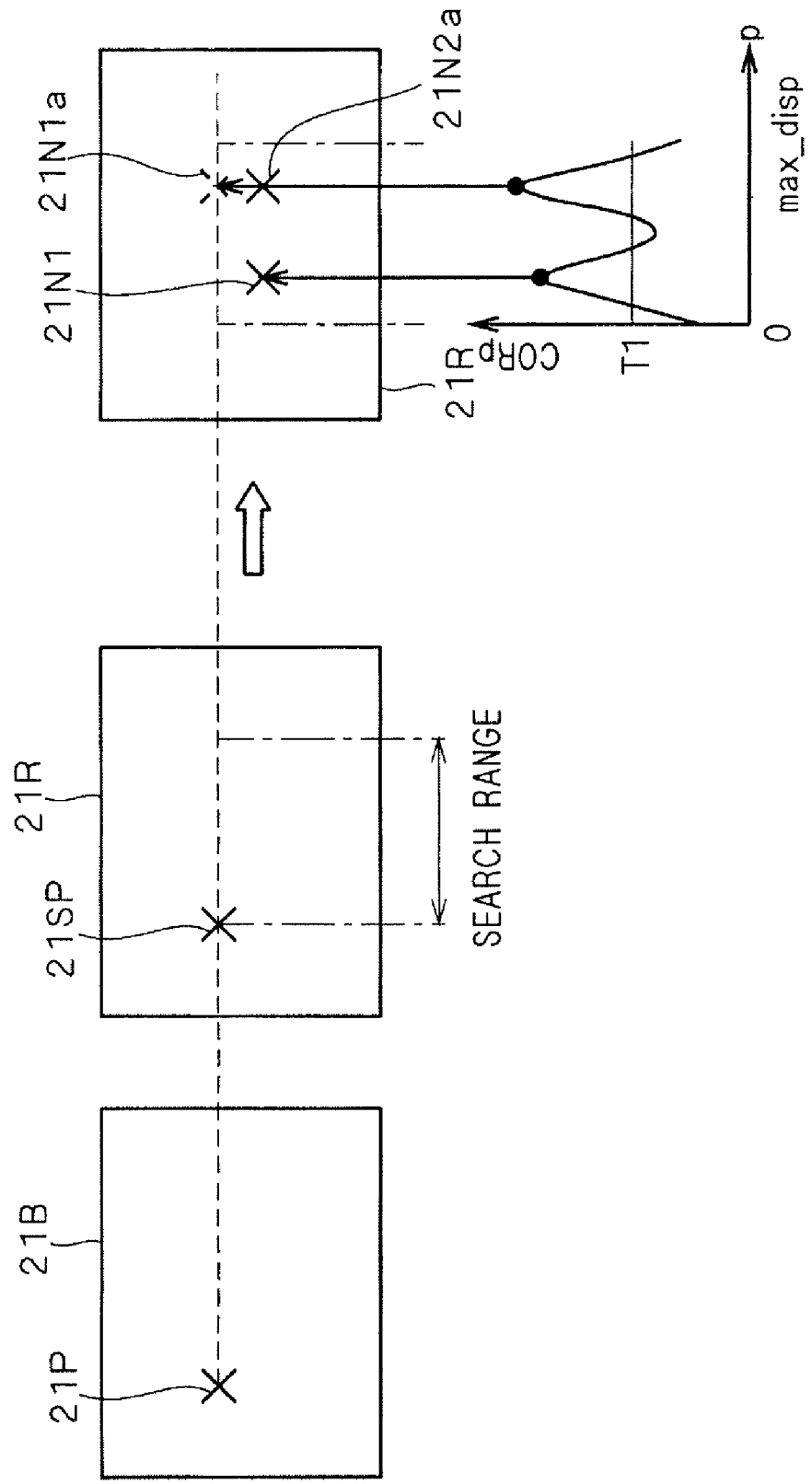

INFORMATION PROCESSING SYSTEM

This application is based on application No. 2007-178515 filed in Japan, the contents of which are hereby incorporated by reference.

BACKGROUND OF THE INVENTION

1. Field of the Invention

The present invention relates to a technique for searching corresponding points from two pieces of image information obtained from a stereo camera.

2. Description of the Background Art

A method is known in a stereo camera that each coordinate point on two images captured from different viewpoints are associated with each other and a three-dimensional position of each coordinate point is calculated from correspondence relation obtained on the basis of the principle of triangulation.

For example, there is a method of obtaining degree of similarity (correlation value; COR) between an image in a window set on an image (base image) and an image in each of a plurality of windows set on another image (reference image) having the same size as the window and searching corresponding points in the two images by specifying the window position on the reference image having the highest degree of similarity. By using the corresponding point searching method, the three-dimensional position of each of points on an image captured by a stereo camera can be obtained.

With respect to the methods as described above, in recent years, attention is paid to corresponding point searching using Phase Only Correlation (POC) method capable of performing robust and high precision associating. In the method, amplitude components in images are eliminated and correlation calculation is performed with only phase components in the images. The method is therefore not easily influenced by brightness fluctuations and noise.

Japanese Patent Application Laid-Open No. 10-134196 discloses a method capable of measuring a distance to a target subject in an image by using POC. A method using POC for associating coordinate points between images is disclosed in Kenji Takita, et al., "High-Accuracy Subpixel Image Registration Based on Phase-Only Correlation", IEICE Trans. Fundamentals, Vol. E86-A, No. 8, August 2003.

In the technique disclosed in Japanese Patent Application Laid-Open No. 10-134196, it is assumed that only one window is set in a distance measurement target portion in an image, so that processing time is not an issue. However, as described in Kenji Takita, et al., "High-Accuracy Subpixel Image Registration Based on Phase-Only Correlation", IEICE Trans. Fundamentals, Vol. E86-A, No. 8, August 2003, in the case of associating coordinate points between images, a problem that processing time is very long arises.

To address such a problem, two cameras to form the stereo camera are mechanically disposed almost parallel with each other (or images arranged almost in parallel with each other are obtained by an image processing). Since a correspondence position on a reference image corresponding to a coordinate point on a base image exists in a direction almost parallel with a base line length, the processing can be performed at high speed by using, for example, an SAD (Sum of Absolute Differences) method or the like.

However, even if the two cameras are disposed in a position almost parallel with each other initially, in the case where the two cameras are deviated from the parallel position due to a change with time or the like, a problem occurs such that precision largely deteriorates.

SUMMARY OF THE INVENTION

An object of the present invention is to provide a technique of associating coordinate points between images at high speed and with high precision.

In order to achieve the object, according to the present invention, an information processing system includes a first specifying part for specifying a first corresponding point on the second image, corresponding to a designation point designated on the first image, by searching on a line along a first basis direction corresponding to a predetermined direction and passing through a position corresponding to the designation point in the second image; a second specifying part for specifying a second corresponding point on the second image, corresponding to the designation point, by searching on a line passing through the first corresponding point in the second image and along a second basis direction almost perpendicular to the first basis direction; and a third specifying part for specifying a third corresponding point on the second image, corresponding to the designation point by searching on a line passing through the second corresponding point in the second image and along the first basis direction.

In the information processing system, at the time of specifying a corresponding point on a second image, corresponding to a designation point designated on a first image, a first corresponding point is specified by searching on a line along a first basis direction and passing through a position corresponding to the designation point, a second corresponding point is specified by searching on a line passing through the first corresponding point and along a second basis direction almost perpendicular to the first basis direction and, further, a third corresponding point is specified by searching on a line passing through the second corresponding point and along the first basis direction. Therefore, coordinate points between images can be associated with each other at high speed and with high precision.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing range data generated by a 3D coordinate computing part.

FIG. 10 is a diagram showing interpolation of pixel data.

FIG. 12 is a functional block diagram of an information processing system according to a third embodiment of the present invention.

FIG. 14 is a functional block diagram of an information processing system according to a fourth embodiment of the present invention.

FIG. 16 is a diagram showing decrease in robustness caused by computation using a one-dimensional window.

FIG. 18 is a diagram for explaining computation performed by a pixel value calculating part.

FIG. 20 is a functional block diagram of an information processing system according to a sixth embodiment of the present invention.

FIG. 21 is a diagram showing processes in a case where a deviation in the vertical direction between first and second corresponding point candidates is equal to or longer than a predetermined distance.

DESCRIPTION OF THE PREFERRED EMBODIMENTS

Embodiments of the present invention will be described below with reference to the drawings.

First Embodiment

Configuration of Information Processing System 10

Figure 1:
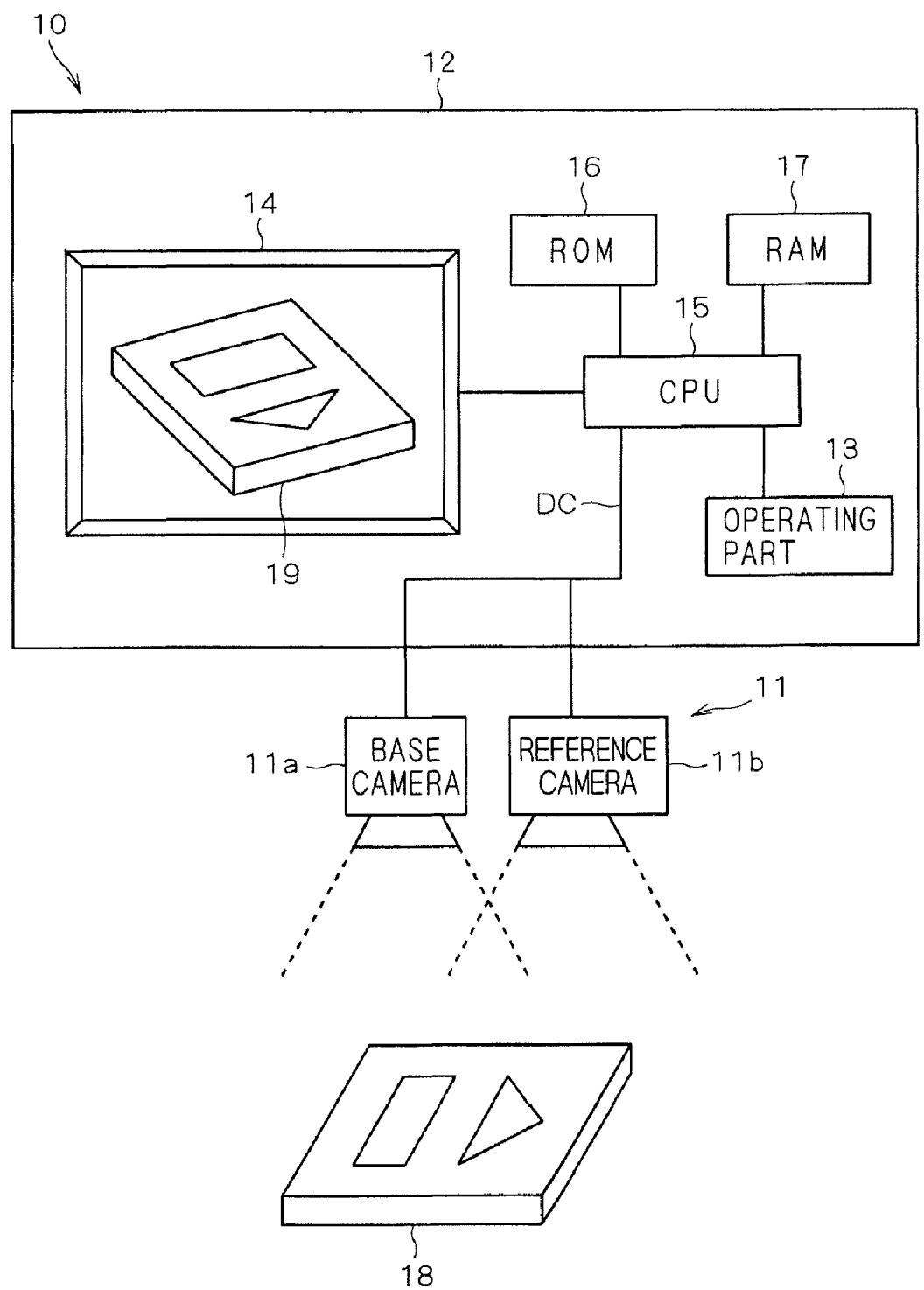
FIG. 1 is a diagram showing a schematic configuration of an information processing system according to a first embodiment of the present invention.

FIG. 1 is a diagram showing a schematic configuration of an information processing system 10 according to a first embodiment of the present invention. The information processing system 10 associates coordinate points on images of a subject 18 captured from different viewpoints with each other and calculates a three-dimensional position of the coordinate points.

A stereo camera 11 has two image capturing systems (cameras) 11a and 11b each including image sensor. The image capturing systems 11a and 11b are disposed apart from each other so that images of the subject 18 in front of the cameras can be captured from different viewpoints at a synchronized timing. Image data captured by photographing is transmitted via data lines DC to an information processing apparatus 12. That is, the stereo camera 11 and the information processing apparatus 12 are connected to each other so that data can be transmitted. In the embodiment, it is assumed that the image capturing system 11a as a base camera transmits a base image (first image) to the information processing apparatus 12, and the image capturing system 11b as a reference camera transmits a reference image (second image) to the information processing apparatus 12.

As the information processing apparatus 12, for example, a PC (Personal Computer) is applied, and has an operating part 13, a display part 14, a CPU 15, a ROM 16, and a RAM 17. The operating part 13 includes a mouse and a keyboard. When the mouse and keyboard are operated by a user, the operating part 13 accepts, for example, an instruction to execute any of various commands to the information processing apparatus 12. The display part 14 is a general display including a display device such as an LCD. The display part 14 displays image information or the like necessary to operate the information processing system 10 and an image 19 of the subject 18 whose the three-dimensional position is calculated.

The CPU 15 executes an arithmetic processing based on an input signal such as a command execution instruction from the operating part 13, generation of an output signal, display control over the display part 14, and the like. The ROM 16 stores data necessary for a control or a program executed by the CPU 15. The RAM 17 temporarily stores data necessary for integrated control of the CPU 15. With the configuration, various functions of the information processing apparatus 12 are realized. That is, the CPU 15 controls each component of the information processing apparatus 12 in cooperation with the ROM 16 and the RAM 17.

Figure 2:
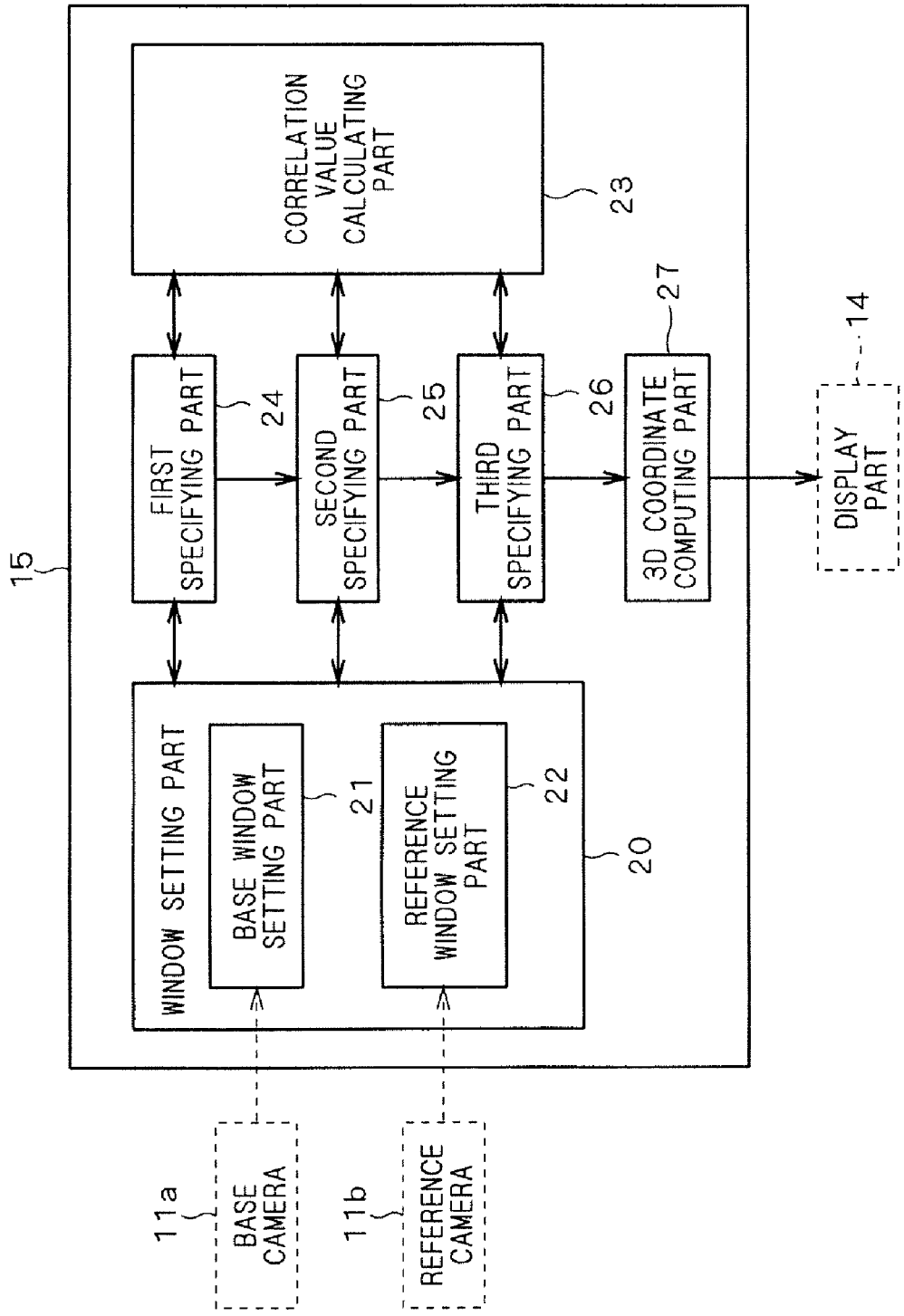
FIG. 2 is a functional block diagram of the information processing system.
Figure 3A:
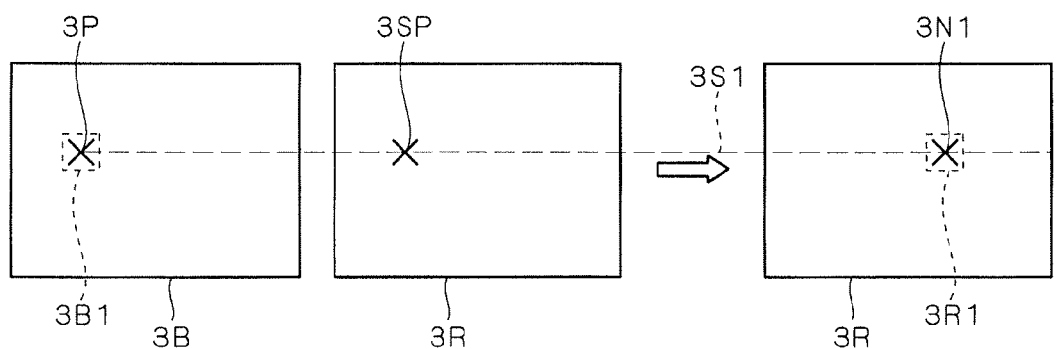
FIGS. 3A to 3C are schematic diagrams showing a procedure of a corresponding point searching process.
Figure 3B:
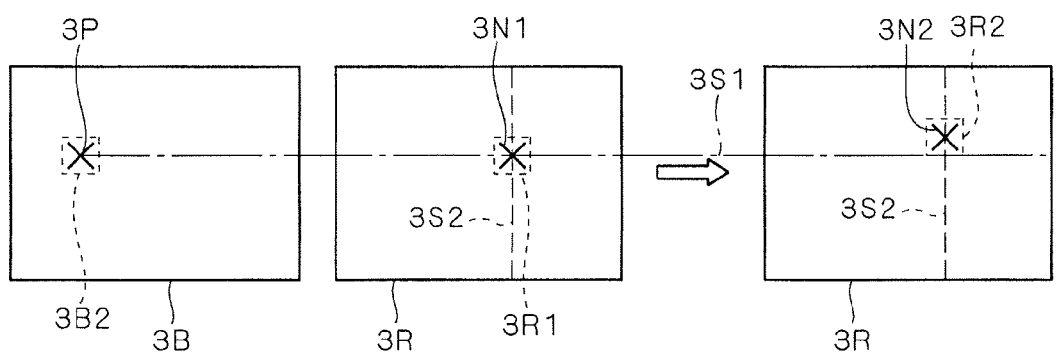
Figure 3C:
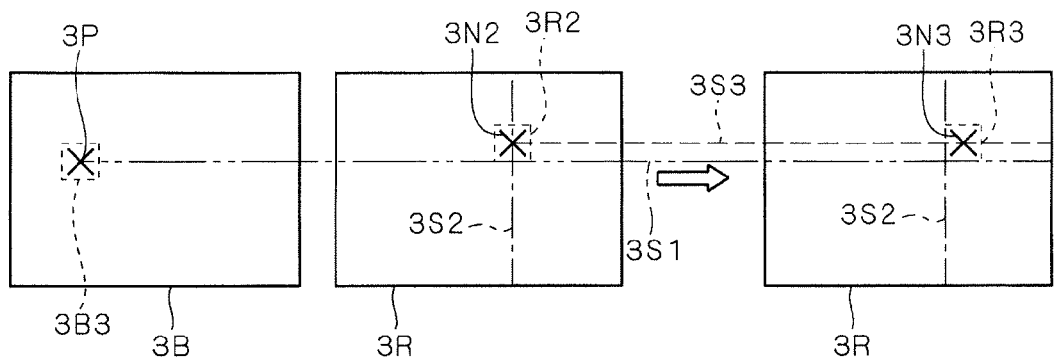

Function of Information Processing Apparatus 12
Corresponding Point Searching Process FIG. 2 is a functional block diagram of the information processing system 10. FIGS. 3A to 3C are schematic diagrams showing a procedure of a corresponding point searching process. The information processing apparatus 12 has a window setting part 20 including a base window setting part 21 and a reference window setting part 22, a correlation value calculating part 23, a first specifying part 24, a second specifying part 25, a third specifying part 26, and a 3D coordinate computing part 27. Those are functional blocks realized when the CPU 15 operates in accordance with a program stored in the ROM 16 while using the RAM 17 as a temporary working area.

The base window setting part 21 corresponds to first window setting means of the present invention and sets base windows (first windows) 3B1 to 3B3 including a designation point 3P on a base image 3B in cooperation with any of the first to third specifying parts 24 to 26. The reference window setting part 22 corresponds to second window setting means of the present invention and sets reference windows (second windows) 3R1 to 3R3 having almost the same size as the base windows 3B1 to 3B3 on a reference image 3R in cooperation with any of the first to third specifying parts 24 to 26. In the embodiment, although a plurality of reference windows are set for each of the reference windows 3R1 to 3R3, only representative one is shown in the diagram. The number of reference windows to be set may be one.

The correlation value calculating part 23 frequency-decomposes a pattern in each of the base windows 3B1 to 3B3 and the plurality of reference windows 3R1 to 3R3 and calculates a correlation value by using a process of computing a correspondence position based on degree of similarity of signals obtained by suppressing amplitude components. Concretely, the peak values of mutual correlation functions between the base windows 3B1 to 3B3 and the plurality of reference windows 3R1 to 3R3 are calculated. The 3D coordinate computing part 27 associates the base image 3B with the reference image 3R with each other on the basis of the peak value calculated by the correlation value calculating part 23, calculates a three-dimensional position, and outputs it to the display part 14 and the like.

The first specifying part 24 specifies a first corresponding point 3N1 on the reference image 3R corresponding to the designation point 3P designated on the base image 3B by searching, on a line passing through a position corresponding to the designation point 3P in the reference image 3R and along a first basis direction corresponding to a predetermined direction. Concretely, the first specifying part 24 searches and specifies the first corresponding point 3N1 on the reference image 3R, on a line passing through a same location point 3SP in the same position as the designation point 3P on the base image 3B and along the first basis direction corresponding to the direction of the base line length of the image capturing systems 11a and 11b disposed apart from each other.

The second specifying part 25 searches on a line passing through the first corresponding point 3N1 on the reference image 3R and along a second basis direction almost perpendicular to the first basis direction, and specifies a second corresponding point 3N2 on the reference image 3R corresponding to the designation point 3P.

The third specifying part 26 searches on a line passing through the second corresponding point 3N2 on the reference image 3R and along the first basis direction and specifies a third corresponding point 3N3 on the reference image 3R corresponding to the designation point 3P. Concretely, the third specifying part 26 searches on a line passing through the second corresponding point 3N2 on the reference image 3R and along the first basis direction on a subpixel unit basis and specifies the third corresponding point 3N3 on the reference image 3R corresponding to the designation point 3P. The term "search on the subpixel unit basis" denotes, in the case where a predetermined position (for example, position of the center of gravity) in each pixel of a single color (for example, R, G, or B) corresponds to coordinates of each pixel, a search for a point positioned between the predetermined positions of neighboring plural pixels as the minimum unit of a search subject of the corresponding point.

Each of the first to third specifying parts 24 to 26 may have the base window setting part and the reference window setting part (which are not shown). Each of the first to third specifying parts 24 to 26 may have a correlation value calculating part (not shown).

More specifically, in the corresponding point searching process, first, as shown in FIG. 3A, the base window setting part 21 and the first specifying part 24 cooperatively set the base window 3B1 including the designation point 3P on the base image 3B. The reference window setting part 22 searches, as a first search area 3S1, on a straight line (a line along the first basis direction) obtained by extending a line segment connecting the designation point 3P and the same location point 3SP on the reference image 3R in the same position as the designation point 3P. The reference window setting part 22 sets a plurality of reference windows 3R1 on the reference image 3R. Further, the first specifying part 24 and the correlation value calculating part 23 cooperatively specify the first corresponding point 3N1.

When the first corresponding point 3N1 is specified, as shown in FIG. 3B, the base window setting part 21 and the second specifying part 25 cooperatively set the base window 3B2 including the designation point 3P on the base image 3B. The reference window setting part 22 and the second specifying part 25 cooperatively search, as a second search area 3S2, on a line along the second basis direction passing through the first corresponding point 3N1 and almost perpendicular to the first basis direction (the direction of the first search area 3S1). The reference window setting part 22 sets a plurality of reference windows 3R2 on the reference image 3R. Further, the second specifying part 25 and the correlation value calculating part 23 cooperatively specify the second corresponding point 3N2.

After the second corresponding point 3N2 is specified, as shown in FIG. 3C, the base window setting part 21 and the third specifying part 26 cooperatively set the base window 3B3 including the designation point 3P on the base image 3B. The reference window setting part 22 and the third specifying part 26 cooperatively search, as a third search area 3S3, on a line passing through the second corresponding point 3N2 and along the first basis direction. The reference window setting part 22 sets the reference window 3R3 on the reference image 3R. Further, the third specifying part 26 and the correlation value calculating part 23 cooperatively specify the third corresponding point 3N3 on the subpixel unit basis.

Also in the second specifying part 25, by searching and specifying the second corresponding point 3N2 on the subpixel unit basis, the points can be associated with each other at higher precision.

POC Method

Figure 4:
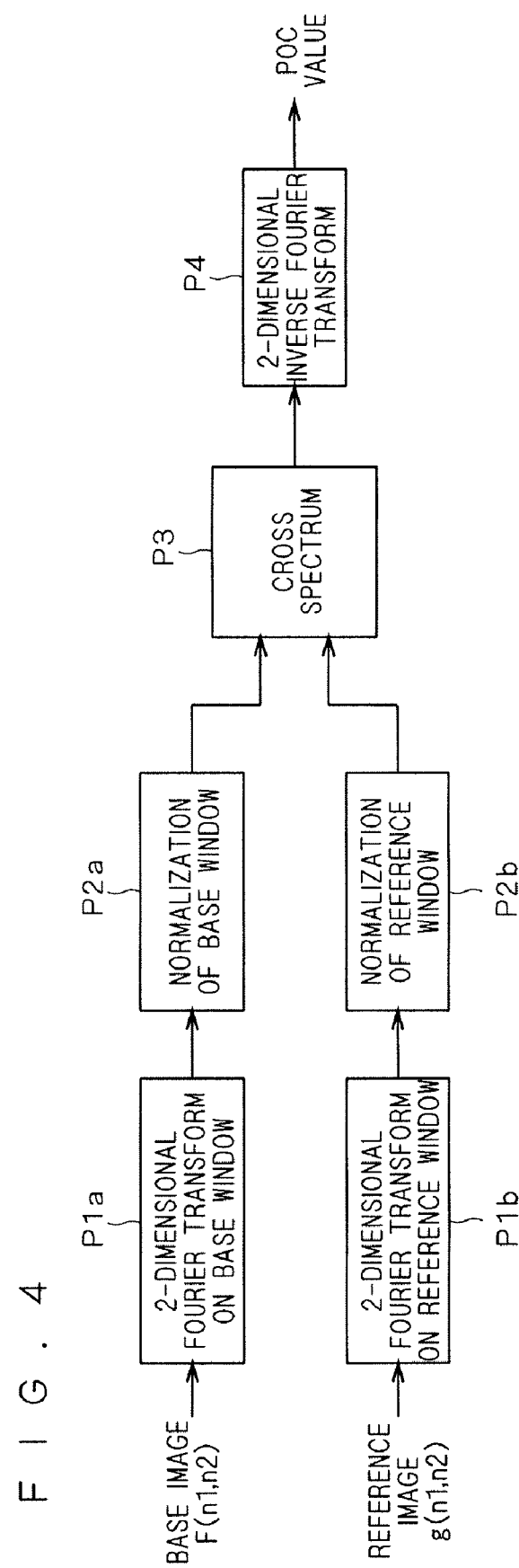
FIG. 4 is a diagram showing a procedure of a corresponding point searching process using a POC method.

FIG. 4 is a diagram showing a procedure of a corresponding point searching process using a POC method. The POC method which is the corresponding point searching process and as one of methods for searching and specifying the first corresponding point 3N1, second corresponding point 3N2, and third corresponding point 3N3 will be described here.

In the POC method, first, an image in the base window 3B1 and an image in the reference window 3R1 are extracted. The size of each of the images is $N_1 \times N_2$ and the images are expressed by the following equations.

$$f(n_1, n_2)$$

$$g(n_1, n_2)$$

where $$n_1 = -M_1, \ldots, M_1$$

$$n_2 = -M_2, \ldots, M_2$$

$$N_1 = 2M_1 + 1$$

$$N_2 = 2M_2 + 1$$

On those equations, two-dimensional Fourier transformation processes P1a and P1b using arithmetic expressions shown in the following equation 1 are performed, thereby performing frequency decomposition. $N_1$ and $N_2$ are substituted for the subscript P of W, and 1 and 2 are substituted for the subscript "s" of k. The process of frequency decomposition does not always have to be Fourier transform but may include any of discrete cosine transform, discrete sine transform, wavelet transform, and Hadamard transform.

$$F(k_1, k_2) = \sum_{n_1, n_2} f(n_1, n_2) W_{N1}^{k_1 n_1} W_{N2}^{k_2 n_2} \quad \text{Equation 1}$$

$$G(k_1, k_2) = \sum_{n_1, n_2} g(n_1, n_2) W_{N1}^{k_1 n_1} W_{N2}^{k_2 n_2}$$

where, $$W_P = \exp\left(-j\frac{2\pi}{P}\right), k_s = -M_s, \ldots, M_s$$

On images subjected to the two-dimensional Fourier transform processes P1a and P1b, normalizing processes P2a and P2b for suppressing amplitude components in the images are performed by using the following equation 2.

$$F'(k_1, k_2) = \frac{F(k_1, k_2)}{|F(k_1, k_2)|}, G'(k_1, k_2) = \frac{G(k_1, k_2)}{|G(k_1, k_2)|} \quad \text{Equation 2}$$

After completion of the normalizing processes P2a and P2b, a cross spectrum process (combining process) P3 using the following arithmetic expression 3 is performed, and a two-dimensional inverse Fourier transform process P4 using the arithmetic expression 4 is performed. In such a manner, the images are correlated with each other, and the result (POC value) is output.

$$R(k_1, k_2) = F'(k_1, k_2)\overline{G'(k_1, k_2)} \qquad \text{Equation 3}$$

$$r(k_1, k_2) = \frac{1}{N_1 N_2} \sum_{k_1, k_2} R(k_1, k_2) W_{N_1}^{-k_1 n_1} W_{N_2}^{-k_2 n_2} \qquad \text{Equation 4}$$

Figure 5:
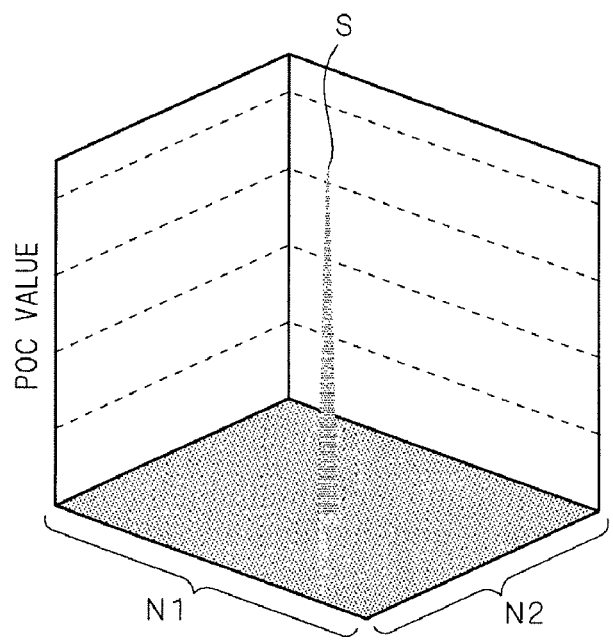
FIG. 5 is a diagram showing an example of a POC value.

FIG. 5 is a diagram showing an example of the POC value. By executing the process using the POC method on a plurality of reference windows (for example, the reference window 3R1) and a base window (for example, the base window 3B1), a sharp peak S is obtained in a position where correlation is high in a window having a size of $N_1 \times N_2$ (the base window 3B1 and the reference window 3R1). Therefore, among the plurality of reference windows 3R1 which are set, the reference window 3R1 including the position on the reference image 3R corresponding to the peak S of the POC value corresponds to the base window 3B1 including the designation point 3P on the base image 3B. That is, the position on the reference image 3R corresponding to the peak S of the POC value corresponds to any of the first to third corresponding points 3N1 to 3N3. In the case where the set windows (the base window 3B1 and the reference window 3R1) are one-dimensional, by setting either $N_1$ or $N_2$ as 1 and performing one-dimensional Fourier transform process, the POC value is obtained.

By the corresponding point searching process using the POC method as described above, the pattern in the window is frequency-decomposed, and a correlation value is calculated by using the process of computing a correspondence position based on degree of similarity of signals in which amplitude components are suppressed. Consequently, by suppressing the influence of brightness fluctuations and noises, the third corresponding point 3N3 on the reference image 3R can be searched with high precision. Since the POC value is obtained discretely, by performing interpolation among neighboring pixels and estimating the position of the peak S by the size of a subpixel smaller than the size of one pixel, a corresponding point can be also detected more finely. An example of the interpolating method is a method of obtaining a parabolic function from the distribution of the POC values discretely obtained.

3D Coordinate Computing Process

Figure 6:
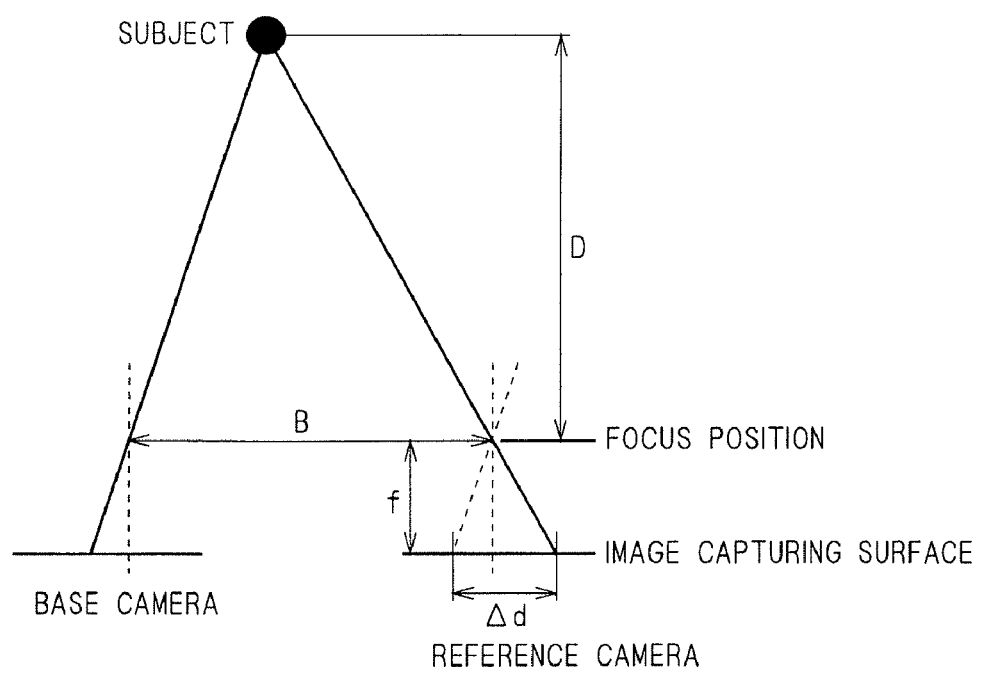
FIG. 6 is a diagram illustrating a 3D coordinate computing process.

FIG. 6 is a diagram showing 3D coordinate computing process. Outline of the process executed by the 3D coordinate computing part 27 will be described here. When the positional difference between the designation point 3P on the base image 3B and the third corresponding point 3N3 on the reference image 3R is Δd by the above-described method, the distance D to the subject 18 is expressed by the following equation.

$$D = fB/\Delta d$$

where f: focal length of the camera lenses of the image capturing systems 11a and 11b, and
B: base line length of the image capturing systems 11a and 11b With the expression, when the coordinates of a target pixel on the base image 3B are "x, y", the three-dimensional position (X, Y, Z) of the subject 18 can be expressed as follows.

$$X = xD/f$$

$$Y = yD/f$$

$$Z = D$$

FIG. 7 is a diagram showing range data generated by the 3D coordinate computing part 27. By executing the corresponding point searching process and the 3D coordinate computing process on all of pixels of the base image 3B, range data 70 can be generated. FIG. 7 shows an example where the distances from the image capturing systems 11a and 11b are expressed on the pixel unit basis as shades of gray. Specifically, the shorter the distance from the image capturing systems 11a and 11b is, the lighter the color is. The longer the distance is, the darker the color is. Among elements 71 to 73 of the subject 18, the element 71 closest to the image capturing systems 11a and 11b is shown in the lightest color. The element 72 further away from the image capturing systems 11a and 11b than the element 71 is displayed darker than the element 71. The element 73 furthest away from the image capturing systems 11a and 11b is shown darker than the element 72.

Operation of Information Processing System 10

Figure 8:
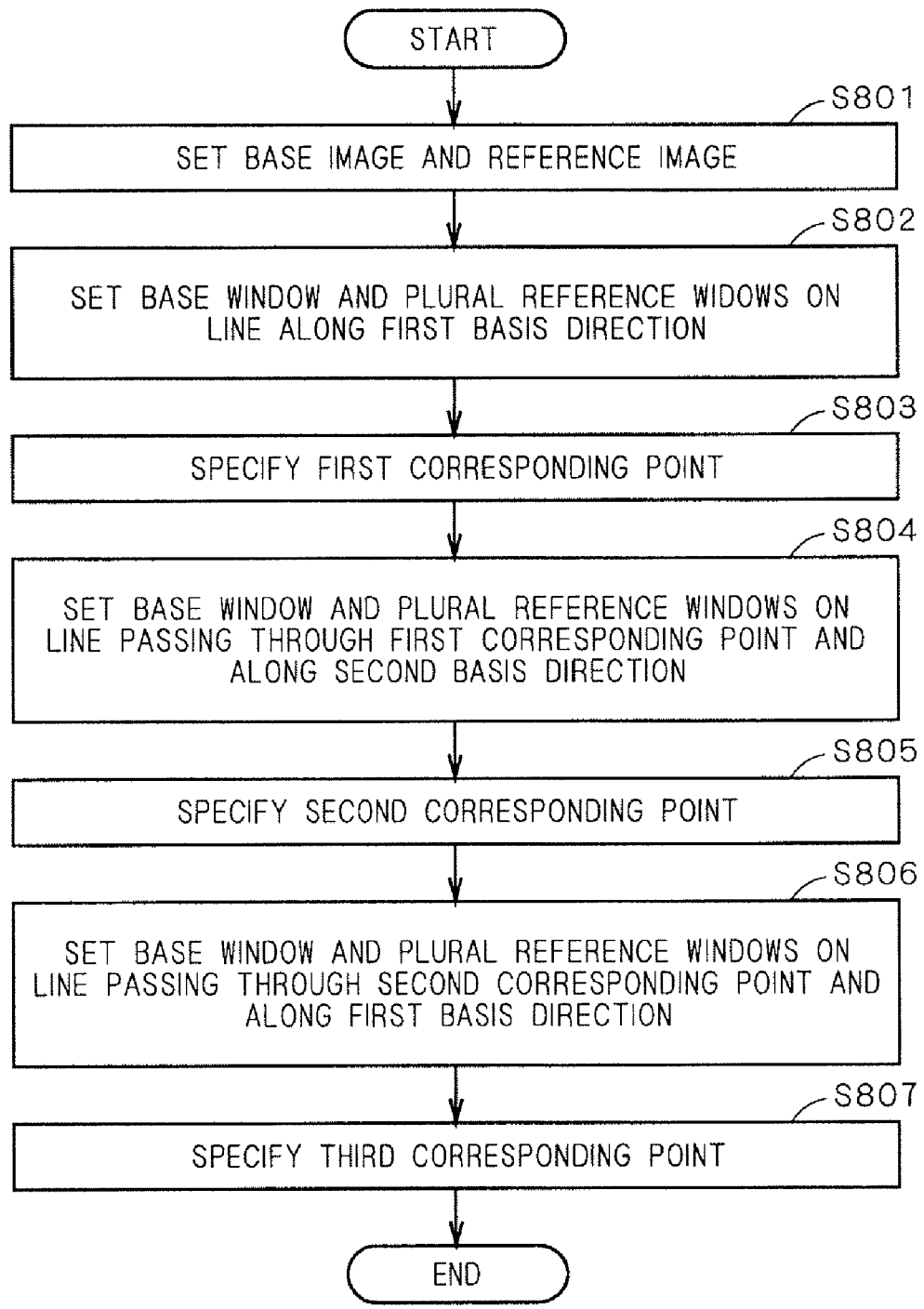
FIG. 8 is a flowchart showing operations of the information processing system.

FIG. 8 is a flowchart showing the operation of the information processing system 10. In the information processing system 10, first, image data from the image capturing systems 11a and 11b is obtained. On the basis of the image data, the base image 3B and the reference image 3R are set. After the base image 3B and the reference image 3R are set, the base window setting part 21 and the first specifying part 24 cooperatively set the base window 3B1, and the reference window setting part 22 and the first specifying part 24 cooperatively set a plurality of reference windows 3R1 on a line along the first basis direction. After the windows are set, the correlation value calculating part 23 and the first specifying part 24 cooperatively specify the first corresponding point 3N1 corresponding to the designation point 3P (steps S801 to S803).

When the first corresponding point 3N1 is specified, the base window setting part 21 and the second specifying part 25 cooperatively set the base window 3B2. The reference window setting part 22 and the second specifying part 25 cooperatively set a plurality of reference windows 3R2 on a line passing through the first corresponding point 3N1 and along the second basis direction. After setting the windows, the correlation value calculating part 23 and the second specifying part 25 cooperatively specify the second corresponding point 3N2 corresponding to the designation point 3P (steps S804 and S805).

After the second corresponding point 3N2 is specified, the base window setting part 21 and the third specifying part 26 cooperatively set the base window 3B2. The reference window setting part 22 and the third specifying part 26 cooperatively set a plurality of reference windows 3R3 on a line passing through the second corresponding point 3N2 and along the first basis direction. After the windows are set, the correlation value calculating part 23 and the third specifying part 26 cooperatively specify the third corresponding point 3N3 (steps S806 and S807).

On the basis of the third corresponding point 3N3 specified in such a manner, the 3D coordinate computing part 27 makes coordinate points on the image of the subject 18 associated with each other, and calculates the three-dimensional position of the coordinate point.

Effect of First Embodiment

As described above, at the time of specifying the corresponding point on the reference image 3R corresponding to the designation point 3P designated on the base image 3B, the first corresponding point 3N1 is specified by searching on the line passing through the position corresponding to the designation point 3P and along the first basis direction, the second corresponding point 3N2 is specified by searching on the line passing through the first corresponding point 3N1 and along the second basis direction almost perpendicular to the first basis direction and, further, the third corresponding point 3N3 is specified by searching on the line passing through the second corresponding point 3N2 and along the first basis direction. Thus, the coordinate points between the images can be associated with each other at high speed and high precision.

The third specifying part 26 searches the third corresponding point 3N3 on the subpixel unit basis and specifies it. Therefore, the coordinate points between the images can be associated with each other with higher precision.

The second specifying part 25 searches the second corresponding point 3N2 on the subpixel unit basis and specifies it. Consequently, when the original deviation of the corresponding point from the designation point 3P is less than one pixel in the second basis direction, the coordinate points between the images can be associated with each other with higher precision.

Further, the first, second, and third specifying parts 24, 25, and 26 specify the first, second, and third corresponding points 3N1, 3N2, and 3N3, respectively, on the basis of correlation values between the base window 3B1 which is set while including the designation point 3P and one or plural reference windows 3R1 to 3R3 sequentially set on the reference image 3R. Thus, the coordinate points between the images can be associated with each other with high precision.

Further, the correlation value calculating part 23 calculates a POC value by using a process of frequency-decomposing patterns in the base windows 3B1 to 3B3 and the reference windows 3R1 to 3R3, and computing the correspondence positions based on degree of similarity of signals obtained by suppressing amplitude components. Therefore, the influence of brightness fluctuations and noise are suppressed, and the first to third corresponding points 3N1 to 3N3 can be searched with high precision.

The process of frequency-decomposing the pattern in the window includes any one of the calculations, which is Fourier transform, discrete cosine transform, discrete sine transform, wavelet transform, and Hadamard transform. Therefore, the computing process is lessened, and the process time can be shortened.

Second Embodiment

In the first embodiment, the case of making the search a plurality of times in the directions orthogonal to each other to specify the third corresponding point while computing the correlation between the base window 3B1 including the designation point 3P and the reference window 3R1 has been described. As a second embodiment of the present invention, the case of interpolating the reference window 3R3 from pixel data of the reference image 3R and computing a mutual correlation function will now be described with reference to the drawings. In the following description of the second embodiment, unless otherwise specified, the same reference numerals are designated to elements having functions similar to those of the first embodiment and a detailed description thereof is omitted.

Configuration and Function of Information Processing System 90

Figure 9:
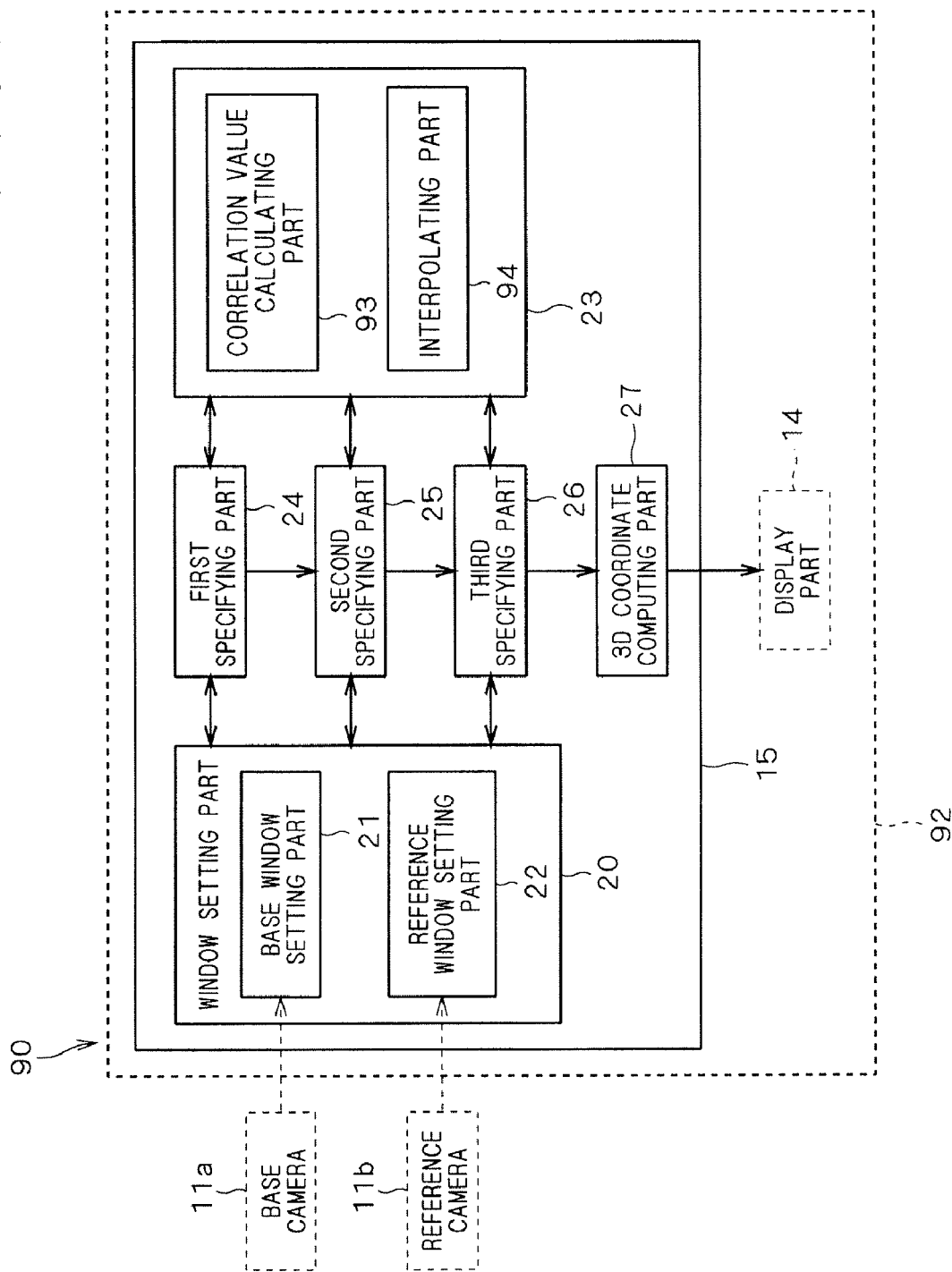
FIG. 9 is a diagram showing a schematic configuration of an information processing system according to a second embodiment of the present invention.

FIG. 9 is a functional block diagram of an information processing system 90 according to a second embodiment of the present invention. FIG. 10 is a diagram for explaining interpolation of pixel data. In an information processing apparatus 92 in the information processing system 90, in addition to the configuration of the first embodiment, at least the third specifying part 26 has an interpolating part (interpolator) 94. The CPU 15 is the functional block realized by operating in accordance with the program stored in the ROM 16 while using the RAM 17 as a temporal working area. In the second embodiment, the first specifying part 24 and the second specifying part 25 also operate in cooperation with the interpolating part 94.

In a case where the reference window 3R3 is set on the subpixel unit basis, the interpolating part 94 calculates a pixel value in the reference window 3R3 by an interpolating process based on the pixel data of the reference image 3R. The term "setting of a window on the subpixel unit basis" denotes, not a setting that a window is constructed by a plurality of pixels of a single color (for example, R, G, or B), but a setting of a window in a position shifted only by a distance shorter than the distance between neighboring pixels. Therefore, when a window is set on the subpixel unit basis, the periphery of the window crosses a plurality of pixels in the vertical or horizontal direction.

Concretely, the reference image 3R is made of pixels of five rows (A to E rows) by nine columns (first to ninth columns). In a case where the reference window 3R3 which is set at the time of specifying the third corresponding point 3N3 is set over the rows B and C, the interpolating part 94 calculates the pixel value of a pixel in the reference window 3R3 on the basis of the pixel values in the row B and the pixel values in the row C. In a case where a pixel value calculated by the interpolating part 94 is made of the lower half pixel in the row B and the upper half pixel in the row C, each pixel value in the reference window 3R3 is calculated as follows.

$$0.5Bn+0.5Cn(n=1 \text{ to } 9)$$

where Bn and Cn denote pixels in the rows B and C, respectively.

A correlation value calculating part 93 calculates the peak value of a mutual correlation function between the base window 3B2 and the reference window 3R3.

In a case where the reference window 3R3 is made of the lower 0.25 pixel in the row D and the upper 0.75 pixel in the row E, each pixel value in the reference window 3R is calculated as follows.

$$0.25Dn+0.75En(n=1 \text{ to } 9)$$

where Dn and En denote pixels in the rows D and E, respectively. In a manner similar to the interpolating process on the reference window 3R3, the interpolating process may be performed on the reference window 3R2 which is set at the time of specifying the second corresponding point 3N2. In any case, in the case where either the second specifying part 25 or the third specifying part 26 performs the interpolating process by using the interpolating part 94, the interpolating process is always executed in the corresponding point searching process of the next time on.

In the embodiment, only pixel data existing in the set reference window 3R3 is used. It is also possible to use high-order interpolation such as cubic convolution. Although a one-dimensional window is shown in FIG. 10, the interpolating process and the setting is performed similarly for a two-dimensional window. As shown in FIG. 10, the one-dimensional window is constructed by a plurality of pixels arranged in one direction.

Operation of Information Processing System 90

Figure 11:
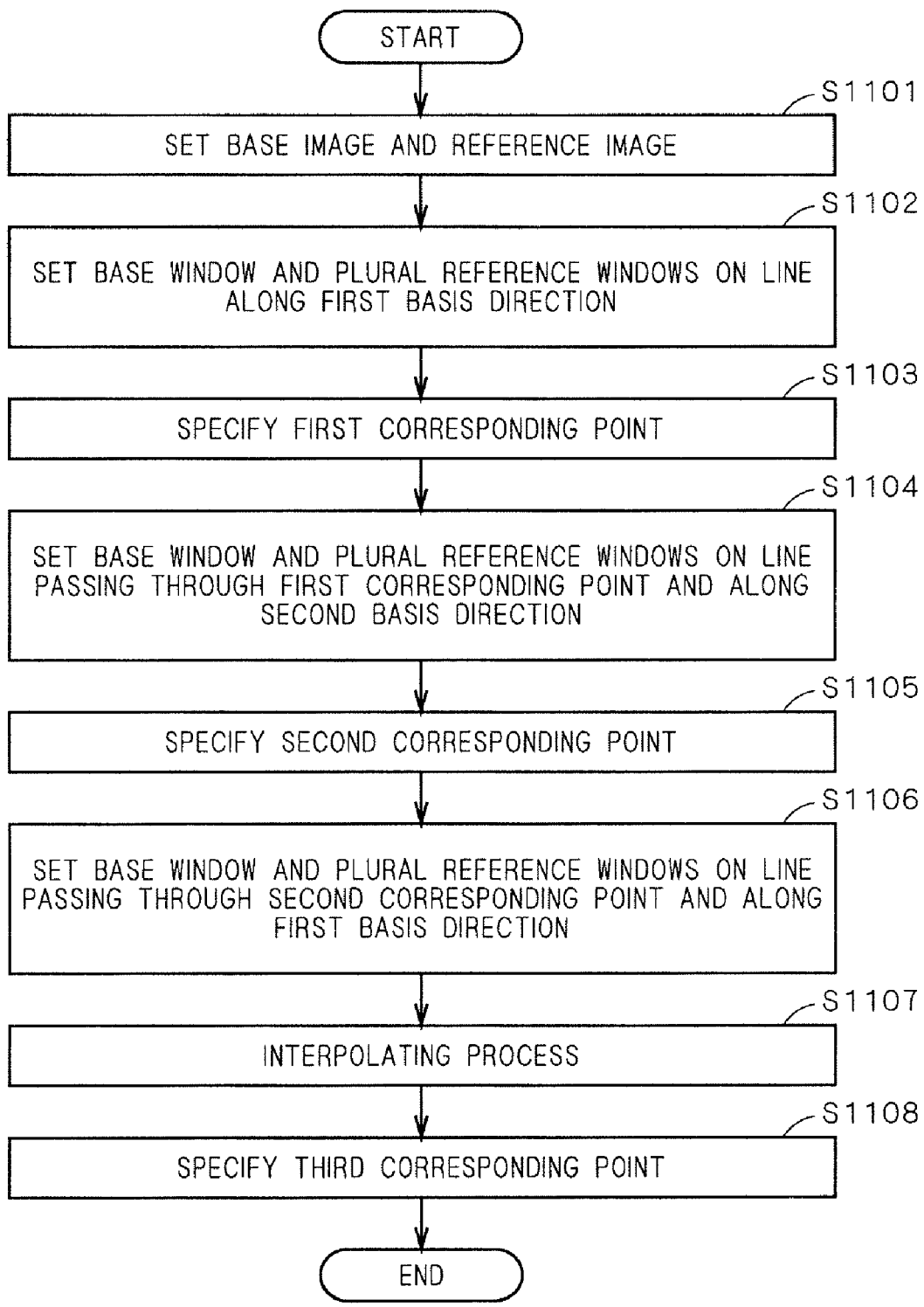
FIG. 11 is a flowchart showing operations of the information processing system.

FIG. 11 is a flowchart showing operation of the information processing system 90. In the information processing system 90, first, processes similar to those in steps S801 to S805 in the first embodiment are executed to specify the second corresponding point 3N2 (steps S1101 to S1105).

When the second corresponding point 3N2 is specified, the base window setting part 21 and the third specifying part 26 cooperatively set the base window 3B3, and the reference window setting part 22 and the third specifying part 26 cooperatively set a plurality of reference windows 3R3 on a line along the first basis direction. The interpolating part 94 calculates a pixel value in an image in each of the plurality of reference windows 3R3 which are set. On the basis of an image in the base window 3B3 and an image in the reference window 3R3, the correlation value calculating part 23 and the third specifying part 26 cooperatively specify the third corresponding point 3N3 (steps S1106 to S1108).

Effect of Second Embodiment

As described above, the interpolating part 94 is further provided, which calculates a pixel value of an image in the reference window 3R3 by the interpolating process based on pixel data of the reference image 3R in the case where the reference window 3R3 is set on the subpixel unit basis. Thus, coordinate points between images can be associated with each other with high precision.

Third Embodiment

As a third embodiment of the present invention, the case of setting, as one-dimensional windows having a length in the search direction, the base windows 3B1 to 3B3 and the reference windows 3R1 to 3R3 will now be described with reference to the drawings.

Configuration and Function of Information Processing System 120

Figure 13A:
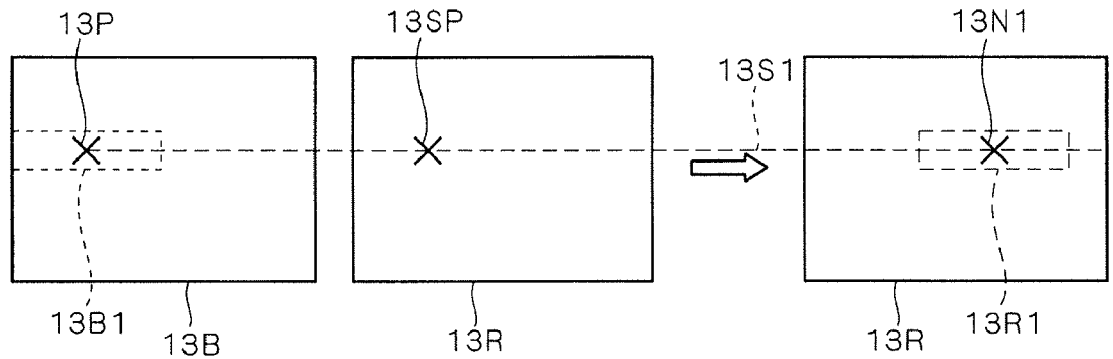
FIGS. 13A to 13C are schematic diagrams showing a procedure of a corresponding point searching process.
Figure 13B:
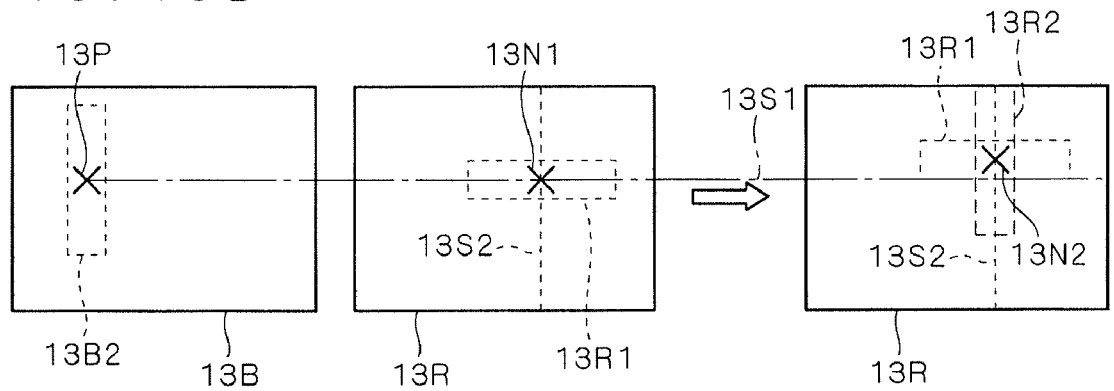
Figure 13C:
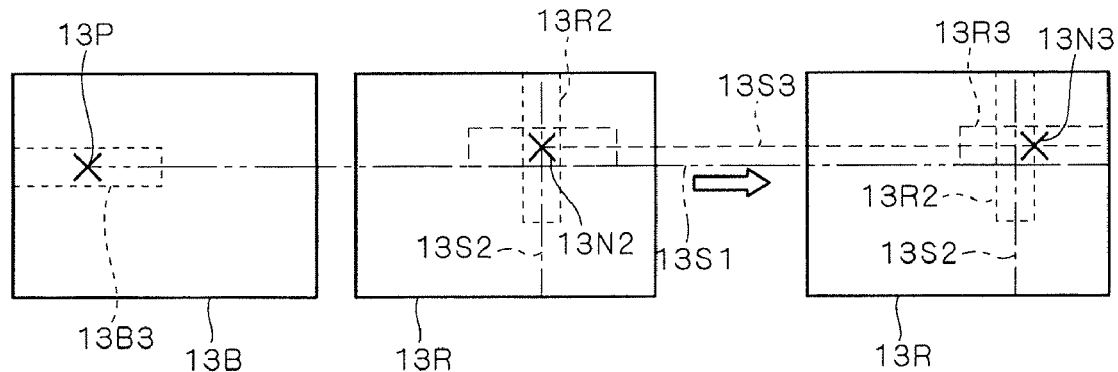

FIG. 12 is a functional block diagram of an information processing system 120 according to a third embodiment of the present invention. FIGS. 13A to 13C are schematic diagrams showing a procedure of the corresponding point searching process. A base window setting part 1221 and a reference window setting part 1222 of an information processing apparatus 122 in the embodiment set one-dimensional windows having a predetermined length of a plurality of pixels which are predetermined in the search direction as the base windows 13B1 to 13B3 and the reference windows 13R1 to 13R3.

Concretely, first, as shown in FIG. 13A, the base window setting part 1221 sets the one-dimensional base window 13B1 including the designation point 13P on the base image 13B and having a length of a plurality of pixels in the first basis direction. The reference window setting part 1222 searches, as the first search area 13S1, on a straight line (the line along the first basis direction) obtained by extending a line segment connecting the designation point 13P and the same location point 13SP on the reference image 13R. The reference window setting part 1222 sets a plurality of one-dimensional reference windows 13R1 on the reference image 13R. Further, the first specifying part 24 and the correlation value calculating part 23 cooperatively specify the first corresponding point 13N1.

After the first corresponding point 13N1 is specified, as shown in FIG. 13B, the base window setting part 1221 and the second specifying part 25 cooperatively set the one-dimensional base window 13B2 including the designation point 13P on the base image 13B. The reference window setting part 1222 and the second specifying part 25 cooperatively search, as the second search area 13S2, on a line passing through the first corresponding point 13N1 and along the second basis direction, and the reference window setting part 1222 sets a plurality of one-dimensional reference windows 13R2 on the reference image 13R. Further, the second specifying part 25 and the correlation value calculating part 23 cooperatively specify the second corresponding point 13N2.

After the second corresponding point 13N2 is specified, as shown in FIG. 13C, the base window setting part 1221 and the third specifying part 26 cooperatively set the base window 13B3 including the designation point 13P on the base image 13B. The reference window setting part 1222 and the third specifying part 26 cooperatively search again, as the third search area 13S3, on a line along the basis direction, and the reference window setting part 1222 sets a plurality of one-dimensional reference windows 13R3 on the reference image 13R. Further, the third specifying part 26 and the correlation value calculating part 23 cooperatively specify the third corresponding point 13N3 on the subpixel unit basis.

Operation of Information Processing System 120

The operation of the information processing system 120 is similar to that of the information processing system 10 according to the first embodiment except for the point that, at the time of setting the base windows 13B1 to 13B3 and the reference windows 13R1 to 13R3, one-dimensional windows extending in the search directions of the first corresponding point 13N1, the second corresponding point 13N2, and the third corresponding point 13N3 are set. The description of the operations using the flowchart will be omitted.

Effect of Third Embodiment

As described above, the base windows 13B1 to 13B3 are one-dimensional windows each having a length of a plurality of pixels in the search direction, and the reference windows 13R1 to 13R3 are one-dimensional windows having almost the same size as that of the base windows 13B1. Therefore, the computation amount related to the search for the corresponding point can be suppressed on precondition that the image capturing systems 11a and 11b for capturing the base image 13B and the reference image 13R respectively are disposed in parallel with each other. Consequently, while associating coordinate points between images with high precision, the process time can be shortened.

Fourth Embodiment

As a fourth embodiment of the present invention, the case of repeating the processes performed by the second and third specifying parts on the basis of the peak value will now be described with reference to the drawings.

Configuration and Function of Information Processing System 140

FIG. 14 is a functional block diagram of an information processing system 140 according to the fourth embodiment of the invention. A correlation value calculating part 143 of an information processing apparatus 142 in the embodiment calculates a peak value of mutual correlation functions between the base windows 3B1 to 3B3 and the reference windows 3R1 to 3R3 (see FIG. 3), and transmits the peak value (for example, a POC value) to a processing controller 144.

The processing controller 144 makes the second specifying part 25 specify the fourth corresponding point by searching on the line passing through the third corresponding point and along the second basis direction, and makes the third specifying part 26 specify the fifth corresponding point by searching on the line passing through the fourth corresponding point and along the first basis direction. Specifically, the processing controller 144 sequentially repeats the process of specifying the (2m)th corresponding point in the second specifying part 25 and specifying the (2m+1)th corresponding point (m∈ natural number) in the third specifying part 26. The processing controller 144 finishes the process when any of the following conditions is satisfied.

1) The POC value obtained from the correlation value calculating part 143 is equal to or larger than a predetermined threshold.
2) An increase amount of the POC value sequentially obtained from the correlation value calculating part 143 is equal to or less than a predetermined threshold.
3) An increasing rate of the POC value sequentially obtained from the correlation value calculating part 143 is equal to or less than a predetermined threshold.

In the present invention, the corresponding point searching process is always finished by the third specifying part 26. Alternately, the second specifying part 25 may finish the corresponding point searching process when the conditions 1 to 3 are satisfied.

Operation of Information Processing System 140

Figure 15:
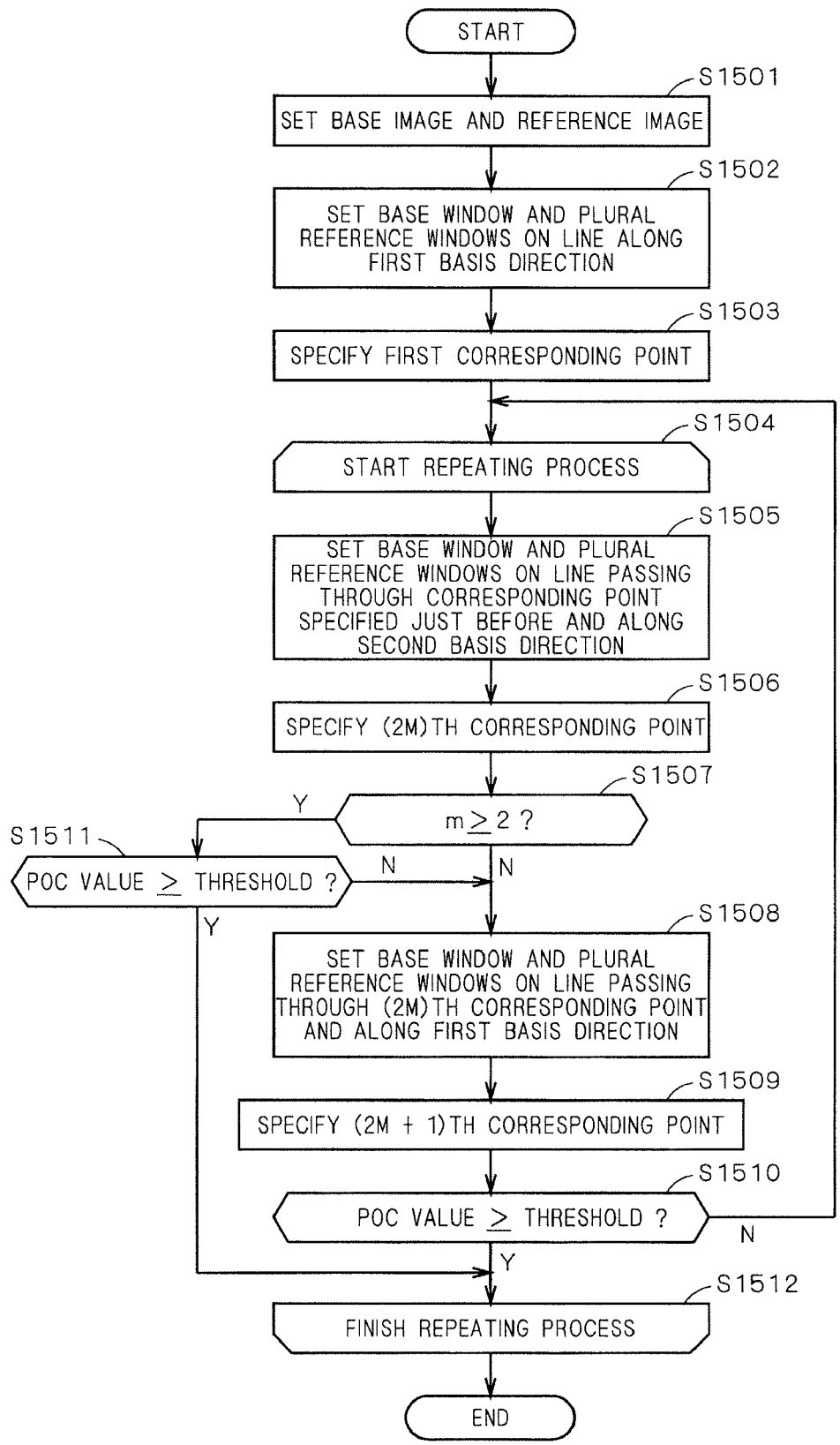
FIG. 15 is a flowchart showing operations of the information processing system.

FIG. 15 is a flowchart showing the operation of the information processing system 140. The case where the condition 1, as one of the conditions of making the processing controller 144 finish the repeating process, is satisfied, that is, the case where the POC value becomes equal to or larger than a predetermined threshold will now be described as an example.

In the information processing system 140, first, image data from the image capturing systems 11a and 11b is obtained and, on the basis of the image data, the base image 3B and the reference image 3R are set. After the base image 3B and the reference image 3R are obtained, the base window setting part 21 and the first specifying part 24 cooperatively set the base window 3B1, and the reference window setting part 22 and the first specifying part 24 cooperatively set a plurality of reference windows 3R1 on a line along the first basis direction. After the windows are set, the correlation value calculating part 143 and the first specifying part 24 cooperatively specify the first corresponding point 3N1 corresponding to the designation point 3P (steps S1501 to S1503).

After the first corresponding point 3N1 is specified, the repeating process is started. The correlation value calculating part 143 and the second specifying part 25 cooperatively search on a line passing through the corresponding point specified just before (in this case, the first corresponding point 3N1) and along the second basis direction to specify the 2m-th corresponding point (in this case, the second corresponding point 3N2) (steps S1504 to S1506).

After the second corresponding point 3N2 is specified, whether step S1506 as the specifying step has been performed twice or more in the series of processes or not, that is, whether "m" of the 2m-th corresponding point specified in step S1506 is a natural number of two or larger is determined. When m=1, "No" is selected (step S1507). On the basis of the second corresponding point 3N2, the correlation value calculating part 143 and the third specifying part 26 cooperatively search on a line passing through the second corresponding point 3N2 and along the first basis direction to specify the (2m+1)th corresponding point (a third corresponding point 3N3 in this case) (steps S1508 and S1509).

After the third corresponding point 3N3 is specified, the processing controller 144 determines whether the POC value when the third corresponding point 3N3 is specified is equal to or larger than the predetermined threshold or not (step S1510). When it is less than the threshold, "No" is selected, and the process returns to step S1504.

The process returns to step S1504 and executes steps S1505 and S1506 to specify the fourth corresponding point (m=2), and "Yes" is selected in step S1507. When "Yes" is selected in step S1507, the processing controller 144 determines whether the POC value when the fourth corresponding point is specified is equal to or larger than the threshold. If "No", the process proceeds to step S1508 (step S1511).

After that, until "Yes" is selected in step S1510 or S1511, that is, until the POC value at the time of specifying the (2m)th corresponding point or the (2m+1)th corresponding point becomes the predetermined threshold or larger, the process is repeated. When the POC value becomes equal to or larger than the threshold, the process is finished (step S1512).

By adding the condition 2 or 3 to the condition 1 as a condition of finishing the repeating process by the processing controller 144, in the case where the increase amount or the increasing ratio of the POC value sequentially obtained becomes a predetermined threshold or less, the process may be finished even if the POC value is less than the threshold. Consequently, the number of repeating processes can be suppressed. By decreasing the computing process, the process time can be shortened.

Effect of the Fourth Embodiment

As described above, the processing controller 144 is further provided, which repeats the process of searching on the line passing through the third corresponding point 3N3 and along the second basis direction to specify the fourth corresponding point in the second specifying part 25, and searching on the line passing through the fourth corresponding point and along the first basis direction to specify the fifth corresponding point in the third specifying part 26. Consequently, by making the search in the directions almost perpendicular to the each other a plurality of times, the corresponding points can be specified. Coordinate points between images can be associated with each other at higher precision.

Fifth Embodiment

As a fifth embodiment of the present invention, the case of obtaining data corresponding to a pixel unit of the base windows 3B1 to 3B3 and the reference windows 3R1 to 3R3 on the basis of a plurality of one-dimensional windows will now be described with reference to the drawings.

FIG. 16 is a diagram for explaining deterioration in robustness caused by computation using one-dimensional windows. In a case where there are a plurality of reference window candidates (in the embodiment, first to third reference window candidates 16Ra to 16Rc) for a base window 16B1 shown in FIG. 16 due to deviation in the parallel arrangement of the image capturing systems 11a and 11b or the like, a problem of decrease in robustness arises. The problem is particularly conspicuous at the time of the first association. By executing a filter process on a plurality of one-dimensional windows, decrease in the robustness is suppressed.

Configuration and Function of Information Processing System 170

Figure 17:
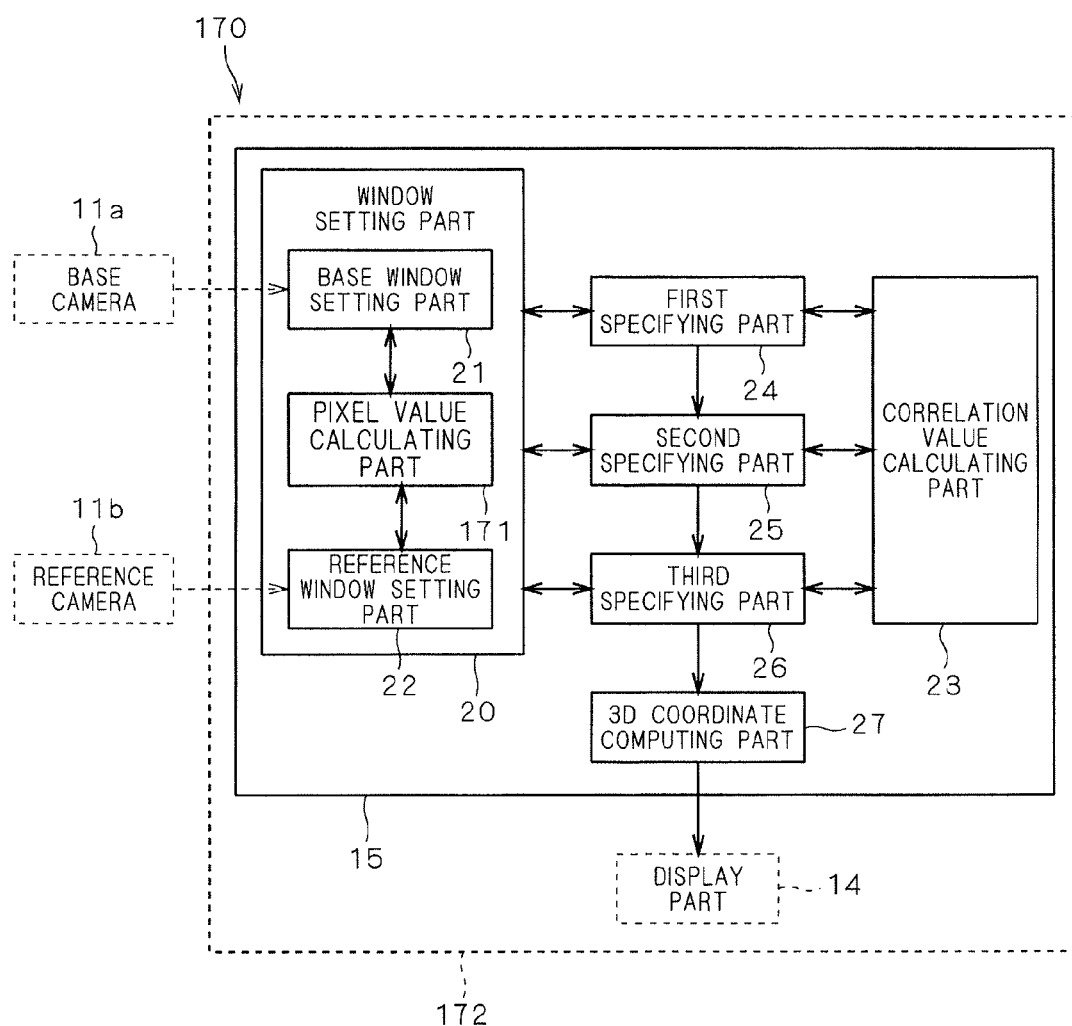
FIG. 17 is a functional block diagram of an information processing system according to a fifth embodiment of the present invention.

FIG. 17 is a functional block diagram of an information processing system 170 according to a fifth embodiment of the invention. FIG. 18 is a diagram for explaining computation performed by a pixel value calculating part 171. The pixel value calculating part 171 cooperatively operates with the base window setting part 21, thereby functioning as a first pixel value calculating means of the present invention, and cooperatively operates with the reference window setting part 22, thereby functioning as a second pixel value calculating means of the present invention. In an information processing apparatus 172 in the fifth embodiment, the base window setting part 21 and the reference window setting part 22 obtain a base window and a reference window, respectively, corresponding to a pixel unit as follows. In cooperation with the base window setting part 21, the pixel value calculating part 171 calculates a pixel value of an image in the base window 3B1 by a filter process based on an image in a first one-dimensional window 3Lb including the designation point 3P (see FIGS. 3A to 3C) and having a length in a direction corresponding to the search direction (first basis direction) and images in one or more second one-dimensional windows 3La and 3Lc neighboring the first one-dimensional window 3Lb in a direction almost perpendicular to the search direction.

In cooperation with the reference window setting part 22, the pixel value calculating part 171 calculates a pixel value in the reference window 3R1 by a filtering process based on any of third one-dimensional windows 3Lp, 3Lq, and 3Lr having a length in the search direction and having almost the same size as that of the base window 3B1, and fourth one-dimensional windows 3Lo to 3Ls neighboring the third one-dimensional windows 3Lp, 3Lq, and 3Lr in the direction (second basis direction) perpendicular to the search direction.

Concretely, in the filtering process performed by the pixel value calculating part 171, for example, at the time of setting a base window, in cooperation with the base window setting part 21, the pixel value calculating part 171 actually applies a proper weight to three lines made of the base line 3Lb which is actually subject to a corresponding point searching process and base lines 3La and 3Lc as upper and lower lines of the base line 3Lb, and calculates a pixel value in the base window 3B1. More specifically, images a, b, and c in the base lines 3La, 3Lb, and 3Lc are multiplied with coefficients α, β, and γ (where α+β+γ=1), respectively. An image obtained by adding the resultant values is set as an image in the base window 3B1. By the process, random noise included in the image is removed and small changes in a density value of each pixel are reduced, so that pixels can be made smooth. Therefore, the corresponding point searching process can be performed at high precision.

Also in the case of setting a reference window, the pixel value calculating part 171 multiplies three lines of an image in a reference line to be actually subjected to the corresponding point searching process (any of images p, q, and r in the reference lines 3Lp, 3Lq, and 3Lr) and images o, p, q, r, and s in the reference lines 3Lo, 3Lp, 3Lq, 3Lr, and 3Ls as upper and lower lines of the reference lines with coefficients α, β, and γ, respectively. An image obtained by adding the resultant values is set as an image of the reference window 3R1 used for the corresponding point searching process. Concretely, three lines of the image "p" in the reference line 3Lp for the base line 3La and the images "o" and "q" in the reference lines 3Lo and 3Lq as upper and lower lines of the reference line 3Lp are multiplied with coefficients α, β, and γ, respectively. An image (α×o+β×p+γ×q) obtained by adding the resultant values is set as an image in the reference window 3R1.

Any one of the images in the reference windows 3Ra to 3Rc calculated by the reference window setting part 22 and the pixel value calculating part 171 may be arbitrarily set as the image of the reference window 3R1 used for the corresponding point searching process. For example, a reference window (in FIG. 18, the reference window 3Rb) whose deviation in the vertical direction from the base window 3B1 is the smallest may be set as the reference window 3R1. Alternatively, in a manner similar to the above process, the pixel value calculating part 171 may multiply the reference windows 3Ra, 3Rb, and 3Rc with coefficients δ, ϵ, and ξ, respectively (where δ+ϵ+ξ=1, not shown) and an image of a reference window (not shown) obtained by adding the resultant windows may be set as the image of the reference window 3R1.

The filter process executed by the pixel value calculating part 171 does not always have to be based on a one-dimensional window neighboring in the second basis direction. In the case where the searching direction is the second basis direction, the filter process based on a one-dimensional window neighboring in the first basis direction may be executed.

The number of lines for setting a window is not always limited to three, and can be appropriately changed. For example, in the case where the base window setting part 21 is set so as to include the designation point 3P near the lower end of the base line 3Lb, the filter process based on the images in the base lines 3Lb and 3Lc may be executed to obtain the image of the base window 3B1. The number of lines may be changed on the basis of, for example, an input operation from the operating part 13. In a case where the pixel value calculating part 171 and the fourth embodiment are combined, and the number of repeating times of the corresponding point searching process controlled by the processing controller is stored and is continuously larger than the predetermined number of times, the number of lines may be increased.

A correlation value calculating part 173 calculates a peak value of mutual correlation functions between an image in the base window 3B1 and an image in the reference window 3R1 set by the base window setting part 21 or the reference window setting part 22 and the pixel value calculating part 171.

Operation of Information Processing System 170

Figure 19:
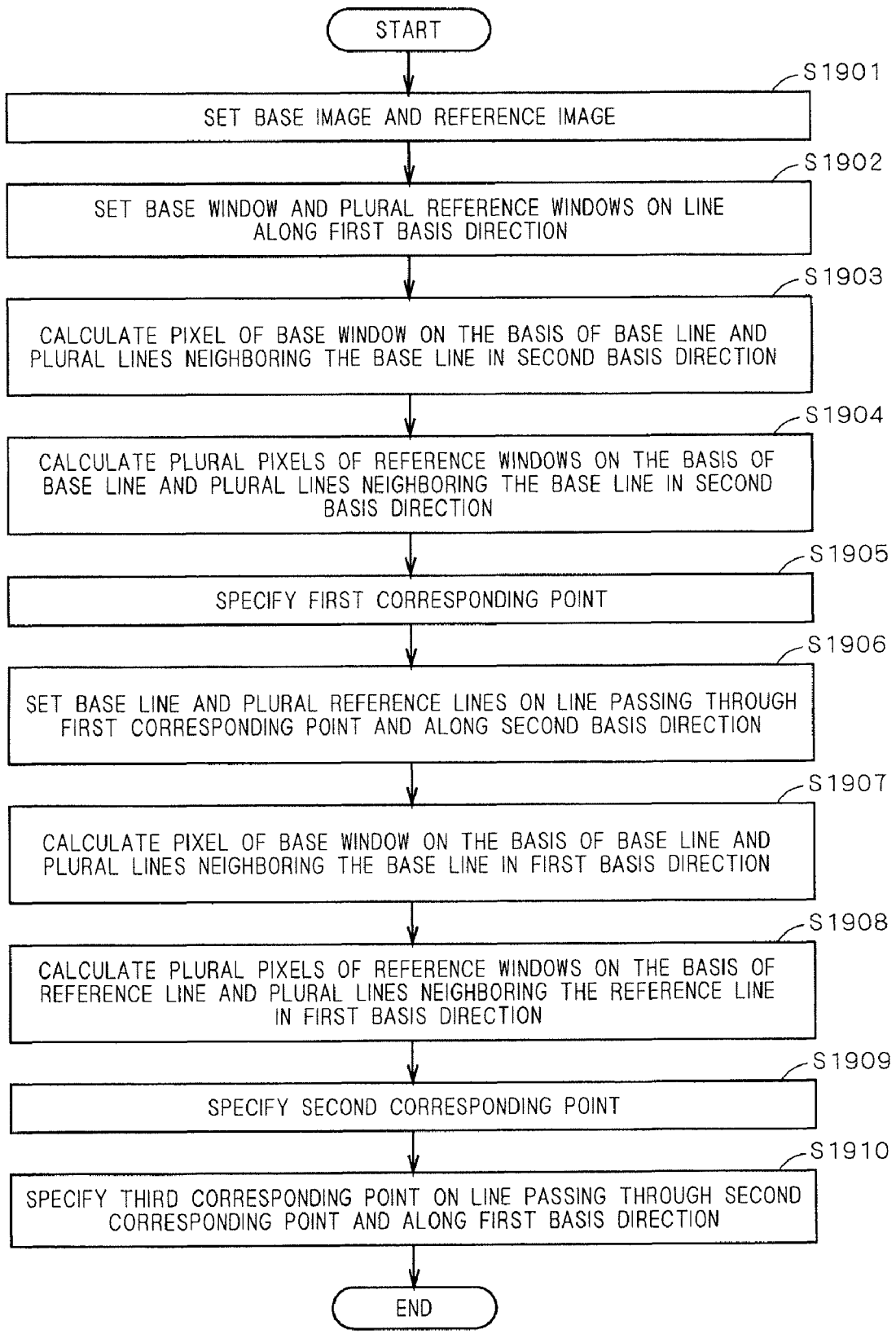
FIG. 19 is a flowchart showing operations of an information processing system.

FIG. 19 is a flowchart showing operations of the information processing system 170. The case will now be described, as an example, in which the pixel value calculating part 171 and the base window setting part 21 cooperate with each other to calculate an image in the base window 3B1 by a filter process based on the base lines 3La to 3Lc, and the pixel value calculating part 171 and the reference window setting part 22 cooperate with each other to calculate an image in the reference window 3R1 by a filter process based on the reference lines 3Lp to 3Lr. The case of performing no filter process at the time of specifying the third corresponding point 3N3 will be also described.

In the information processing system 170, first, the base image 3B and the reference image 3R are set on the basis of image data obtained from the image capturing systems 11a and 11b. After the base image 3B and the reference image 3R are obtained, the base window setting part 21, the first specifying part 24, and the pixel value calculating part 171 cooperate with each other to set the base line 3Lb on a line along the first basis direction. The reference window setting part 22, the first specifying part 24, and the pixel value calculating part 171 cooperate with each other to set a plurality of reference lines 3Lq along the first basis direction. The reference lines 3Lq shown in the diagram is a representative line in the plurality of reference lines (steps S1901 and S1902).

After the base line 3Lb is set, an image in the base window 3B1 is calculated on the basis of the image in the base line 3Lb and the images in the plurality of base lines 3La and 3Lc neighboring the base line 3Lb in the second basis direction. After the reference line 3Lq is set, the image in the reference window 3R1 is calculated a plurality of times on the basis of the image in the reference line 3Lq and the images in the plurality of reference lines 3Lp and 3Lr neighboring the reference line 3Lq in the second basis direction. After the images in the windows are calculated, the correlation value calculating part 173 and the first specifying part 24 cooperate with each other to specify the first corresponding point 3N1 corresponding to the designation point 3P (steps S1903 to S1905).

After the first corresponding point 3N1 is specified, the base window setting part 21, the second specifying part 25, and the pixel value calculating part 171 cooperate with each other to set a base line (not shown) on a line along the second basis direction. The reference window setting part 22, the second specifying part 25, and the pixel value calculating part 171 cooperate with each other to set a plurality of reference lines (not shown) on a line passing through the first corresponding point 3N1 and along the second basis direction. After the base line and the plurality of reference lines are set, images in the base window 3B2 and the plurality of reference windows 3R2 are calculated on the basis of images in the set lines and images in a plurality of lines neighboring the set lines in the first basis direction. After calculation of the images in the windows, the correlation value calculating part 173 and the second specifying part 25 cooperate each other to specify the second corresponding point 3N2 corresponding to the designation point 3P (steps S1906 to S1909).

After the second corresponding point 3N2 is specified, processes similar to those of the embodiment are executed to specify the third corresponding point 3N3 (step S1910).

Effect of Fifth Embodiment

As described above, the pixel value calculating part 171 is further provided. The pixel value calculating part 171 calculates the pixel value of the image in the base window 3B1 by the filter process based on the image in the base line 18Lb including the designation point 3P and having a length in the direction corresponding to the search direction and the images in one or more base lines 18La and 18Lc neighboring the base line 18Lb in the direction perpendicular to the search direction. The pixel value calculating part 171 also calculates the pixel value of the image in the reference window 3R1 by the filter process based on the image in the reference line 18Lq having a length in the search direction and having almost the same size as that of the base window 3B1 and the images in the reference lines 18Lp and 18Lr neighboring the reference line 18Lq in the direction perpendicular to the search direction. Consequently, the influence of a deviation of the corresponding point in a direction perpendicular to the search direction can be reduced, and the robustness can be increased.

Sixth Embodiment

As a sixth embodiment of the present invention, the case of searching a high-reliable corresponding point when a deviation in the perpendicular direction between the first corresponding point 3N1 and the second corresponding point 3N2 is equal to or longer than a predetermined distance will now be described with reference to the drawings.

Configuration and Function of Information Processing System 200

FIG. 20 is a functional block diagram of an information processing system 200 according to a sixth embodiment of the present invention. FIG. 21 is a diagram illustrating processes performed in a case where a deviation in the vertical direction between first and second corresponding point candidates 21N1a and 21N2a is equal to or longer than a predetermined distance. For example, when a deviation in the vertical direction between the first and second corresponding points 21N1 and 21N2 is equal to or larger than the predetermined number of pixels, the reliability of the first corresponding point 21N1 may be low. For example, when the maximum deviation amount in stereo arrangement of the image capturing systems 11a and 11b is at a subpixel level, if a deviation of one pixel or larger occurs, there is the possibility that an error occurs in the correspondence position in the horizontal direction.

A correlation value calculating part 203 in an information processing apparatus 201 of the sixth embodiment calculates a correlation value between an image in a base window (not shown) set on the base image 21B and an image in a reference window (not shown) set on the reference image 21R on the basis of the images by using the sum-of-absolute-differences method (SAD method). The correlation value is temporarily stored in a storage 202. The correlation value calculated by the correlation value calculating part 203 has a plurality of extreme values irrespective of the POC method described in the first to fifth embodiments and the SAD method described in the sixth embodiment. The SAD method will be described in more detail later.

A first specifying part 204 specifies, as the first corresponding point candidate 21N1a, coordinates indicative of the maximum value in a plurality of extreme values calculated by the correlation value calculating part 203. A second specifying part 205 specifies, as the second corresponding point candidate 21N2a, coordinates indicative of the maximum value in a plurality of extreme values calculated by the correlation value calculating part 203.

The information processing apparatus 201 also has a determining part 208 for determining whether the distance between the first corresponding point candidate 21N1a and the second corresponding point candidate 21N2a is equal to or longer than a predetermined distance (for example, one pixel length). In the case where the determining part 208 determines that the distance between the first and second corresponding point candidates 21N1a and 21N2a corresponds to one pixel length or more, the first specifying part 204 reads a correlation value when the first corresponding point candidate 21N1a is specified from the storage 202 and specifies, as the first corresponding point 21N1, coordinates indicative of the largest extreme value next to the maximum value in the correlation values. On the other hand, when it is determined that the distance between the first and second corresponding point candidates 21N1a and 21N2a is less than one pixel, the second specifying part 205 specifies the second corresponding point candidate 21N2a as the second corresponding point 21N2.

A determining part 206 may determine whether the distance between the first corresponding point 21N1 on the coordinates indicative of the largest extreme value next to the maximum value in the correlation values and the second corresponding point 21N2 specified on the basis of the first corresponding point 21N1 is equal to or longer than the predetermined distance or not. In the case where the distance between the first corresponding point 21N1 and the second corresponding point 21N2 is equal to or longer than the predetermined distance, the first specifying part 204 may read a correlation value at the time when the first corresponding point 21N1 is specified from the storage 202 and specify, as the first corresponding point (not shown), coordinates indicative of the third, fourth, . . . extreme values. Alternatively, it may be determined that a corresponding point cannot be specified, and a predetermined error process may be executed. The predetermined error process is a process of notifying the user of an error by displaying an error message on the display part 14 or the like.

After the first corresponding point 21N1 is specified, in a manner similar to the foregoing embodiment, a second corresponding point (not shown) is specified again, and a third corresponding point 21N3 is specified.

SAD Method

Figure 22A:
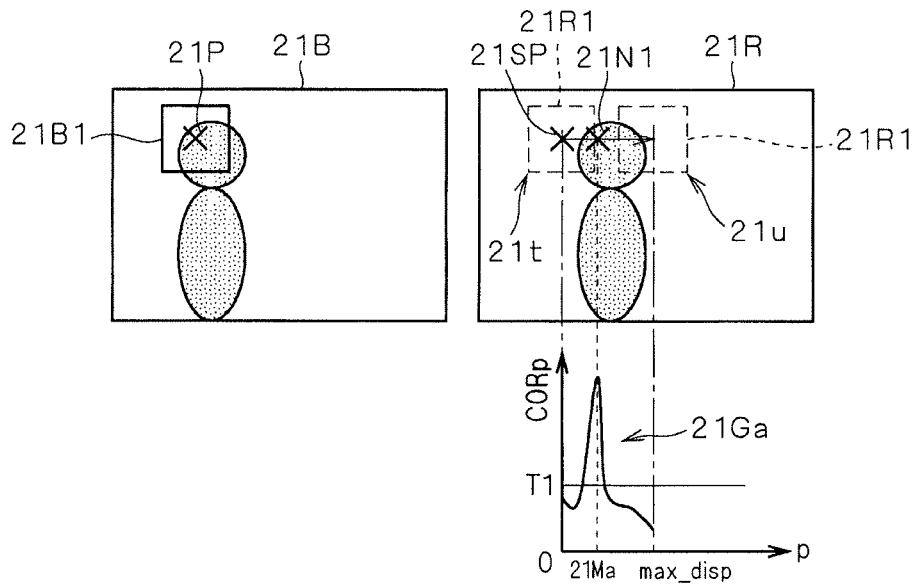
FIGS. 22A to 22C are diagrams showing a procedure of a corresponding point searching process using a SAD method.
Figure 22B:
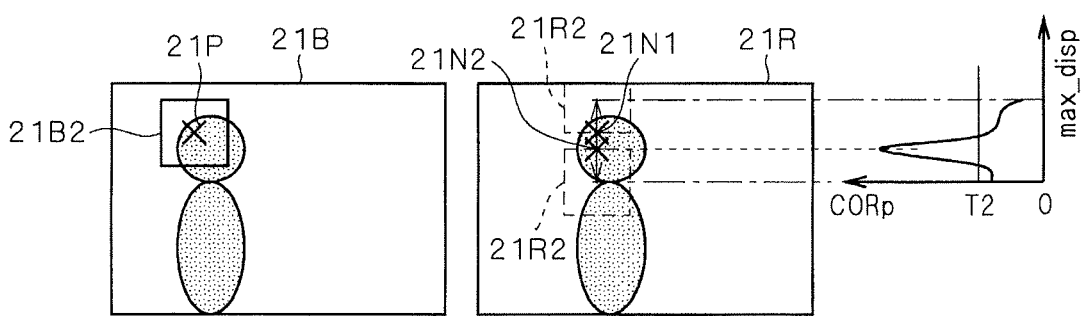
Figure 22C:
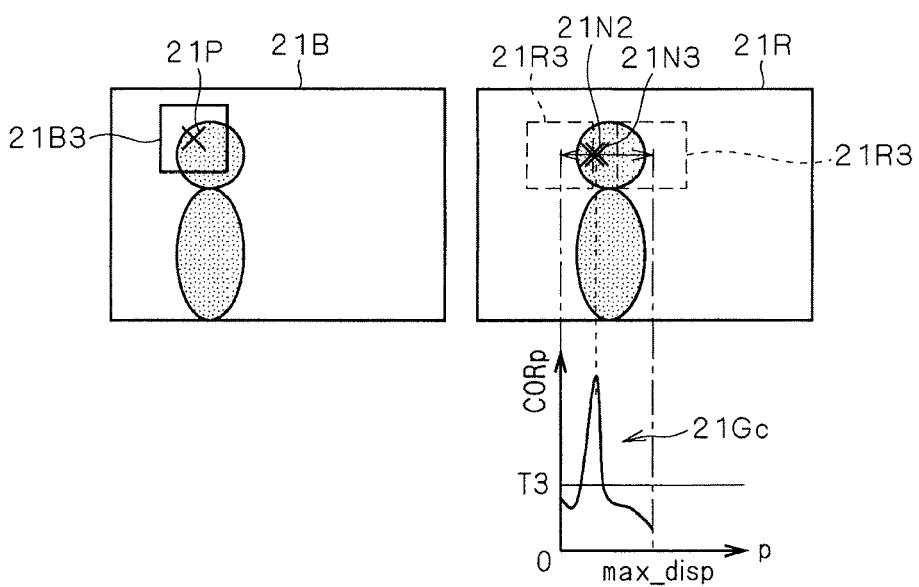

FIGS. 22A to 22C are diagrams showing the procedure of a corresponding point searching process using the SAD method. The SAD method as one of methods of searching and specifying the first, second, and third corresponding points 21N1, 21N2, and 21N3 in the corresponding point searching process will now be described.

Two images synchronously obtained by the image capturing systems 11a and 11b are set as a base image 21B and a reference image 21R. A base window 21B1 including a designation point 21P as a center point is set on the base image 21B. A plurality of reference windows 21R1 each having almost the same size as that of the base window 21B1 are set on the reference image 21R. In FIGS. 22A to 22C, to simplify the explanation, only two reference windows at both ends of a plurality of reference windows to be set are shown.

The plurality of reference windows 21R1 are set in the range of the maximum parallax 0<p<max_disp. For example, as shown in FIG. 22A, a plurality of reference windows 21R1 each shifted by one pixel in a first basis direction are set in a range from a position 21t (position of parallax=0) on the reference image 21R to a position 21u corresponding to the maximum parallax max_disp.

At parallaxes "p", that is, at the positions of the reference windows 21R1 to 21R3, correlation values between images in the base windows 21B1 to 21B3 and images in the reference windows 21R1 to 21R3 are computed. In the correlation computation, for example, a correlation value CORp is calculated by the following equation using density Img1(i,j) of each pixel in the base window 21B1 and density Img2(i,j+p) of each pixel in the reference window 21R1 at the parallax "p".

$$COR_p = \frac{1}{SAD_p + 1}$$ Equation 5 where, $$SAD_p = \sum_{j=1}^{w}\sum_{i=1}^{w} |Img1(i, j) - Img2(i, j + p)|$$

w×w denotes window size.

When the correlation values CORp at each of the parallaxes "p" are calculated, the relations between the parallaxes "p" and the correlation values CORp become clear as shown in graphs 21Ga to 21Gc in FIGS. 22A to 22C. In the graph 21Ga, the center point of the reference window corresponding to the parallax 21Ma at which the correlation value CORp is the maximum is a first corresponding point 21N1. In the corresponding point searching process using the SAD method, it is difficult to perform high-precision corresponding point search like POC method. But the computation amount is suppressed, thus corresponding point search higher than the POC method can be performed. In the case where windows which are set (the base windows 21B1 to 21B3 and the reference windows 21R1 to 21R3) are one-dimensional windows, by setting the window size to w×1 and i=1, the correlation value CORp is obtained.

Operation of Information Processing System 200

Figure 23:
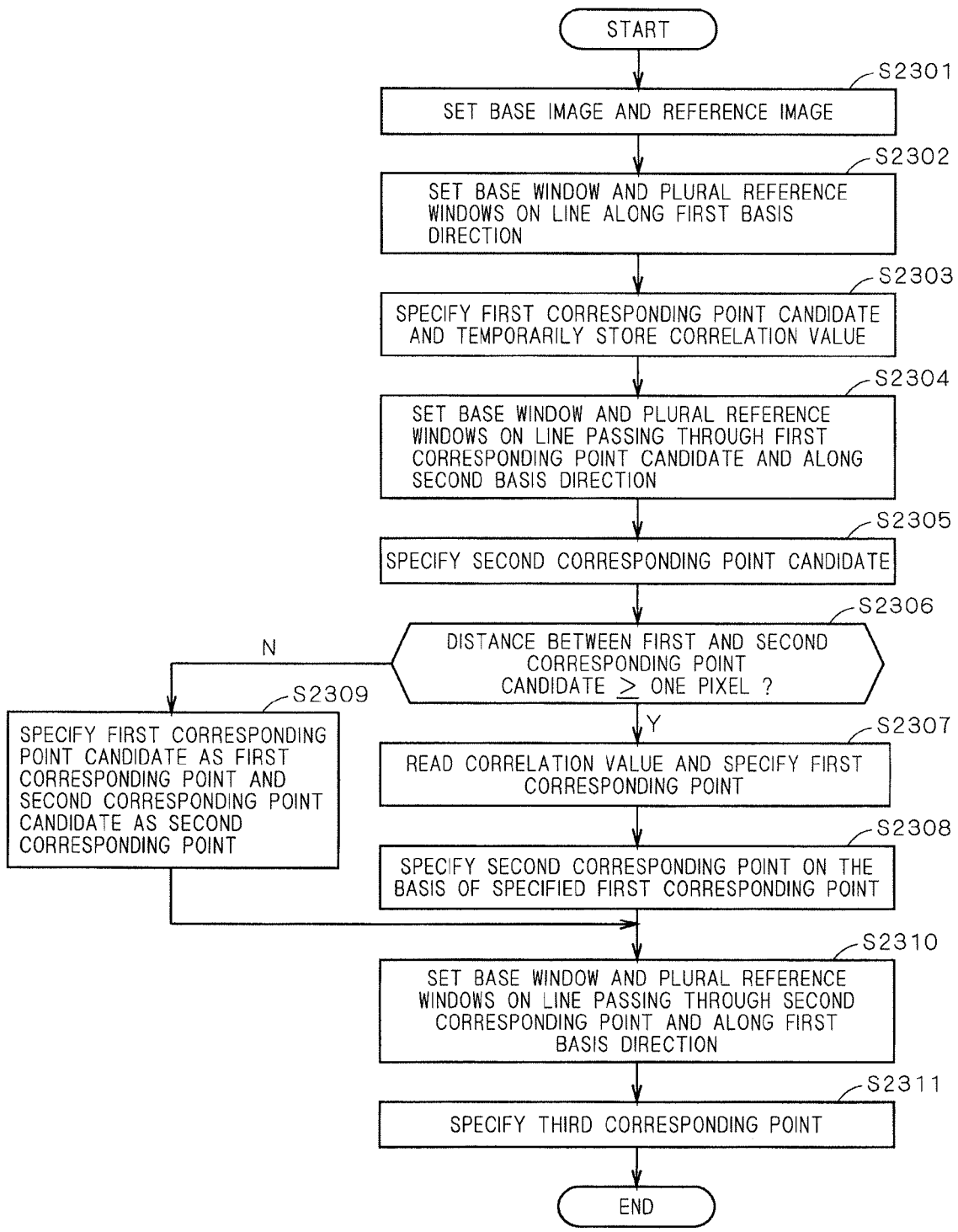
FIG. 23 is a flowchart showing operations of an information processing system.

FIG. 23 is a flowchart showing the operation of the information processing system 200. In the information processing system 200, when the base image 21B and the reference image 21R are set, the base window setting part 21 and the first specifying part 204 cooperatively set the base window 21B1 on a line along a first basis direction, and the reference window setting part 22 and the first specifying part 204 cooperatively set a plurality of reference windows 21R1 on a line along the first basis direction. After the windows are set, the correlation value calculating part 203 and the first specifying part 204 cooperatively specify a first corresponding point candidate 21N1a corresponding to the designation point 21P and temporarily store the correlation value CORp calculated by the correlation value calculating part 203 into the storage 202 (steps S2301 to S2303).

When the first corresponding point candidate 21N1a is specified, the base window setting part 21 and the second specifying part 205 cooperatively set the base window 21B2. The reference window setting part 22 and the second specifying part 205 cooperatively set a plurality of reference windows 21R2 on a line passing through the first corresponding point candidate 21N1a and along the second basis direction. After setting the windows, the correlation value calculating part 203 and the second specifying part 205 cooperatively specify the second corresponding point candidate 21N2a corresponding to the designation point 21P (steps S2304 and S2305).

After the second corresponding point candidate 21N2a is specified, the determining part 208 determines whether the distance between the first corresponding point candidate 21N1a and the second corresponding point candidate 21N2a corresponds to one pixel or larger. When it is determined that the distance between them is one pixel or larger, "Yes" is selected. The first specifying part 204 reads the correlation value CORp when the first corresponding point candidate 21N1a is specified from the storage 202 and specifies, as the first corresponding point 21N1, coordinates indicative of the largest extreme value next to the maximum value in the plurality of extreme values included in the correlation value CORp. Further, the second corresponding point 21N2 is specified on the basis of the specified first corresponding point 21N1. On the other hand, when it is determined that the distance between them is less than one pixel, "No" is selected, and the second corresponding point candidate 21N2a is specified as the second corresponding point 21N2 (steps S2306 to S2309).

After the second corresponding point 21N2 is specified, the base window setting part 21 and the third determining part 207 cooperatively set the base window 21B3 on a line along the first basis direction. The reference window setting part 22 and the third specifying part 207 cooperatively set the plurality of reference windows 21R3 on a line passing through the second corresponding point 21N2 and along the first basis direction. When the windows are set, the correlation value calculating part 203 and the third specifying part 207 cooperate with each other to specify the third corresponding point 21N3 corresponding to the designation point 21P (steps S2310 and S2311).

Effect of Sixth Embodiment

As described above, in the case where the determining part 208 determines that the distance between the first corresponding point candidate 21N1a and the second corresponding point candidate 21N2a is equal to or longer than a predetermined distance, the first specifying part 204 specifies, as the first corresponding point 21N1, coordinates indicative of the largest extreme value next to the maximum value in the plurality of extreme values. Consequently, an error in search of a corresponding point which may occur in the case where a deviation in the parallel arrangement of the image capturing means that captures images from different viewpoints is large can be avoided.

The correlation value calculating part 203 calculates the correlation value CORp by using the SAD method, so that the computing process is reduced, and the process time can be shortened.

Modifications

The embodiments of the present invention have been described above. Obviously, the embodiments may be properly combined. The embodiments may be provided with the following functions.

First Modification

For example, at the time of specifying the first corresponding points 3N1, 13N1, and 21N1, in the case where the reliability of the corresponding point searching process is lower than a predetermined value, the possibility that an obtained result is erroneous is high. Even if the reference windows 3R2, 13R2, 21R3, and 21R4 in the vertical direction are set, obviously, correct second corresponding points 3N2, 13N2, and 21N2 and correct third corresponding points 3N3, 13N3, and 21N3 cannot be obtained. Therefore, when the reliability of the first corresponding points 3N1, 13N1, and 21N1 is lower than a predetermined value, an error value may be sent back as associated with no point. As a result, the following process (the process for specifying the second corresponding points 3N2, 13N2, and 21N2 and the third corresponding points 3N3, 13N3, and 21N3) does not have to be performed. The computation load is reduced and an error output can be prevented.

In the case where the reliability of the first corresponding points 3N1, 13N1, and 21N1 is lower than a predetermined value, a two-dimensional window may be set in the position of any of the first corresponding points 3N1, 13N1, and 21N1. When a corresponding point having a high correlation value is specified by executing the process using the two-dimensional window, the process of specifying the second corresponding points 3N2, 13N2, and 21N2, and the third corresponding points 3N3, 13N3, and 21N3 using the result is performed. In such a manner, even if a corresponding point cannot be specified in a one-dimensional window, by using a two-dimensional window having large information amount, the invention can address to a case where a corresponding point can be associated. The shape of the two-dimensional window is not limited to the square shape.

Second Modification

In the foregoing embodiments, it is assumed to perform the corresponding point searching process in the first basis direction, the process in the second basis direction, and the process in the first basis direction on the pixel unit basis of the base images 3B, 13B, and 21B. The invention is not limited to the embodiments. For example, in the case where a deviation in the second basis direction between the base images 3B, 13B, and 21B and the reference images 3R, 13R, and 21R is constant in all of pixels, the deviation in the second basis direction may be calculated by performing the process in the first basis direction and the process in the second basis direction on at least a pixel in a certain point. At the time of performing the process on the rest of the pixels, by setting the one-dimensional windows (the reference windows 3R3, 13R3, 21R5, and 21R6) in the first basis direction in consideration of the deviation in the second basis direction obtained by the process on the pixel in one point, the process can be performed at high speed.

Third Modification

In the second modification, the case where the deviation in the second basis direction is uniform in a whole image is assumed but a deviation in the second basis direction in a center portion in an image and that in an end portion are not always the same. However, when compared with neighboring pixels, it is assumed that there is no large difference in the deviations in the second basis direction.

When a deviation in the second basis direction is calculated by performing the process in the first basis direction and the process in the second basis direction on a pixel, at the time of processing the next pixel, one-dimensional windows (the reference windows 3R3, 13R3, 21R5, and 21R6) in the first basis direction may be set in consideration of the deviation in the second basis direction obtained just before. Thus, the process can be performed at high speed.

Fourth Modification

In the repeating process shown in the fourth embodiment, the process in the first basis direction, the process in the second basis direction, and the process in the first basis direction are regarded as one set. The process in the first basis direction and that in the second basis direction are performed alternately. However, they do not always have to be performed alternately. When there is a deviation in POC values or correlation values CORp between the base windows 3B1, 13B1, and 21B1 and the reference windows 3R1, 13R1, and 21R1 (that is, when a movement amount is large), the reference windows 3R3, 13R3, and 21R3 in the same direction (for example, the first basis direction) are set again in the obtained correspondence positions and specified in a smaller unit (for example, in the case of making a search on the pixel unit basis initially, the subpixel unit). Therefore, the precision of the correspondence position in the first basis direction is further increased, so that the precision of the correspondence position in the second basis direction in a latter stage can be also improved.

Fifth Modification

In the sixth embodiment, a correspondence position in the first basis direction is calculated and, after that, a correspondence position in the second basis direction is calculated. In the case where the obtained position in the second basis direction is deviated by a predetermined number of pixels or more, there is the possibility that the reliability of the correspondence position in the first basis direction obtained first is low. Consequently, in a manner similar to the first modification, an error value may be sent back as associated with no point or a two-dimensional window may be set in the position to perform a process.

While the invention has been shown and described in detail, the foregoing description is in all aspects illustrative and not restrictive. It is therefore understood that numerous modifications and variations can be devised without departing from the scope of the invention.

What is claimed is:

1. An information processing system for performing processes on first image and second image captured from different viewpoints, comprising:
a first specifying part for specifying a first corresponding point on said second image, corresponding to a designation point designated on said first image, by searching on a line along a first basis direction corresponding to a predetermined direction and passing through a position corresponding to said designation point in said second image;

a second specifying part for specifying a second corresponding point on said second image, corresponding to said designation point, by searching on a line passing through said first corresponding point in said second image and along a second basis direction almost perpendicular to said first basis direction; and a third specifying part for specifying a third corresponding point on said second image, corresponding to said designation point, by searching on a line passing through said second corresponding point in said second image and along said first basis direction.

2. The information processing system according to claim 1, wherein said third specifying part makes a search for said third corresponding point on a subpixel unit basis and specifies said third corresponding point.

3. The information processing system according to claim 2, wherein said second specifying part makes a search for said second corresponding point on a subpixel unit basis and specifies said second corresponding point.

4. The information processing system according to claim 1, further comprising a processing controller for making said second specifying part specify a fourth corresponding point by searching on a line passing through said third corresponding point and along said second basis direction, and for making said third specifying part specify a fifth corresponding point by searching on a line passing through said fourth corresponding point and along said first basis direction.

5. The information processing system according to claim 4, wherein said correlation value calculating part calculates said correlation value by using a process of frequency-decomposing a pattern in a window and computing a correspondence position based on degree of similarity of signals obtained by suppressing an amplitude component.

6. The information processing system according to claim 5, wherein the process of frequency-decomposing the pattern in said window includes any one of the calculations, which is Fourier transform, discrete cosine transform, discrete sine transform, wavelet transform, and Hadamard transform.

7. The information processing system according to claim 5, wherein said correlation value calculating part calculates said correlation value by using a sum of absolute differences method.

8. The information processing system according to claim 1, wherein each of said first to third specifying parts comprises:

a first window setting part for setting a first window including said designation point on said first image;

a second window setting part for setting one or more second windows each having almost the same size as that of said first window, on said second image along a search direction for searching for said first corresponding point, said second corresponding point and said third corresponding point; and a correlation value calculating part for calculating a correlation value between said first window and said second window, wherein each of said first corresponding point, said second corresponding point and said third corresponding point is specified based on the correlation value calculated by said correlation value calculating part.

9. The information processing system according to claim 8, wherein said third specifying part further comprises an interpolator, when said second window is set on a subpixel unit basis, for calculating a pixel value of an image in said second window by an interpolating process based on pixel data of said second image.

10. The information processing system according to claim 8, wherein said first window is a one-dimensional window having a length in a direction corresponding to said search direction, and said second window is a one-dimensional window having a length in said search direction and having a size almost the same as that of said first window.

11. The information processing system according to claim 10, further comprising:

a first pixel value calculating part for calculating a pixel value in an image in said first window by a filter process using an image in a first one-dimensional window included in said first image, including said designation point, and having a length in a direction corresponding to said search direction, and an image in at least one second one-dimensional window neighboring said first one-dimensional window in a direction almost perpendicular to said search direction; and a second pixel value calculating part for calculating a pixel value in an image in said second window by a filter process using an image in a third one-dimensional window included in said second image, having a length in said search direction, and having almost the same size as that of said first window and an image in at least one fourth one-dimensional window neighboring said third one-dimensional window in a direction perpendicular to said search direction.

12. The information processing system according to claim 8, wherein said first specifying part specifies, as a first corresponding point candidate, coordinates indicative of a maximum value in a plurality of extreme values of a correlation value calculated by said correlation value calculating part, the second specifying part specifies, as a second corresponding point candidate, coordinates indicative of a maximum value in correlation values calculated by said correlation value calculating part on a line passing through said first corresponding point candidate and along said second basis direction, the system further comprises a determining part for determining whether distance between said first corresponding point candidate and said second corresponding point candidate is equal to or longer than a predetermined distance or not, and when the determining part determines that the distance between said first corresponding point candidate and said second corresponding point candidate is equal to or longer than said predetermined distance, said first specifying part specifies, as said first corresponding point, coordinates indicative of an extreme value which is largest next to said maximum value in said plurality of extreme values.

* * * * *